(12) United States Patent
Kimura et al.

(10) Patent No.: US 11,271,515 B2
(45) Date of Patent: Mar. 8, 2022

(54) MOTOR CONTROL DEVICE

(71) Applicant: HITACHI AUTOMOTIVE SYSTEMS, LTD., Hitachinaka (JP)

(72) Inventors: Makoto Kimura, Yokohama (JP); Kohtaro Shiino, Isehara (JP); Hideaki Shimazu, Yokohama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/967,471

(22) PCT Filed: Feb. 4, 2019

(86) PCT No.: PCT/JP2019/003772
§ 371 (c)(1),
(2) Date: Aug. 5, 2020

(87) PCT Pub. No.: WO2019/176366
PCT Pub. Date: Sep. 19, 2019

(65) Prior Publication Data
US 2021/0226574 A1 Jul. 22, 2021

(30) Foreign Application Priority Data
Mar. 16, 2018 (JP) .............................. JP2018-049738

(51) Int. Cl.
*H02P 27/06* (2006.01)
*H02P 27/08* (2006.01)
(Continued)

(52) U.S. Cl.
CPC .............. *H02P 29/40* (2016.02); *B62D 5/046* (2013.01); *H02M 7/48* (2013.01); *H02P 25/03* (2016.02); *H02P 27/08* (2013.01)

(58) Field of Classification Search
CPC .......... H02P 27/06; H02P 27/08; H02P 25/03; B62D 5/046
See application file for complete search history.

(56) References Cited

U.S. PATENT DOCUMENTS 9,490,506 B2 * 11/2016 Suzuki .................. H02J 7/0025
10,673,371 B2 * 6/2020 Hayakawa ............ H02P 29/032
(Continued)

FOREIGN PATENT DOCUMENTS

| JP | H03-253293 A | 11/1991 |
| JP | 2012-060841 A | 3/2012 |

(Continued)

OTHER PUBLICATIONS

International Search Report issued in corresponding application No. PCT/JP2019/003772 dated May 7, 2019 with English translation.
(Continued)

*Primary Examiner* — Thai T Dinh
(74) *Attorney, Agent, or Firm* — Foley & Lardner LLP

(57) ABSTRACT

A motor control device includes a first inverter selector configured to output first PWM signals selectively or simultaneously to a first inverter unit and a second inverter unit, and a first microcomputer configured to output the first PWM signals and a first selection signal to the first inverter selector, and the first selection signal contains information on whether the first PWM signals are to be output to the first inverter unit and whether the first PWM signals are to be output to the second inverter unit.

25 Claims, 22 Drawing Sheets

(51) Int. Cl.
    *H02P 25/03*    (2016.01)
    *H02P 29/40*    (2016.01)
    *B62D 5/04*     (2006.01)
    *H02M 7/48*     (2007.01)

(56) References Cited

U.S. PATENT DOCUMENTS

| | | | |
|---|---|---|---|
| 2004/0239262 A1* | 12/2004 | Ido | H05B 41/3927 |
| | | | 315/291 |
| 2012/0062158 A1 | 3/2012 | Itou | |
| 2014/0009093 A1* | 1/2014 | Suzuki | H02P 21/50 |
| | | | 318/400.02 |
| 2017/0349207 A1* | 12/2017 | Maeshima | B60L 3/0092 |
| 2018/0175779 A1* | 6/2018 | Koseki | H02P 29/028 |
| 2018/0208236 A1* | 7/2018 | Asao | H02P 29/0241 |
| 2018/0269771 A1* | 9/2018 | Mori | H02M 1/00 |
| 2019/0097565 A1* | 3/2019 | Hayakawa | H02P 25/22 |
| 2019/0193774 A1 | 6/2019 | Nakada | |

FOREIGN PATENT DOCUMENTS

| | | | |
|---|---|---|---|
| JP | 2014-091456 A | | 5/2014 |
| JP | 2014091456 A | * | 5/2014 |
| JP | 2017-034882 A | | 2/2017 |
| JP | 2017-169384 A | | 9/2017 |
| JP | 2018-034676 A | | 3/2018 |

OTHER PUBLICATIONS

Written Opinion issued in corresponding application No. PCT/JP2019/003772 dated May 7, 2019 with English translation.

* cited by examiner

MOTOR CONTROL DEVICE

TECHNICAL FIELD

The present invention relates to a motor control device.

BACKGROUND ART

In Patent Literature 1, there is disclosed a motor control device including inverters redundantly configured to drive a brushless motor.

CITATION LIST

Patent Literature

PTL 1: JP 03-253293 A

SUMMARY OF INVENTION

Technical Problem

In the above-mentioned motor control device, there has been a need to selectively or simultaneously use a plurality of inverters based on situations.

Solution to Problem

An object of the present invention is to provide a motor control device allowing simultaneous or selective use of a plurality of inverters based on situations.

A motor control device according to one embodiment of the present invention includes a first inverter switching control unit and a first microcomputer.

The first inverter switching control unit is configured to selectively or simultaneously output first motor command signals to a first inverter unit and a second inverter unit.

The first microcomputer is configured to output the first motor command signals and a first inverter switching control signal to the first inverter switching control unit. The first inverter switching control signal contains information on whether or not the first motor command signals are to be output to the first inverter unit and whether or not the first motor command signals are to be output to the second inverter unit.

Thus, according to the one embodiment of the present invention, the plurality of inverters can selectively or simultaneously be used in accordance with the situation.

DESCRIPTION OF EMBODIMENTS

First Embodiment

Figure 1:
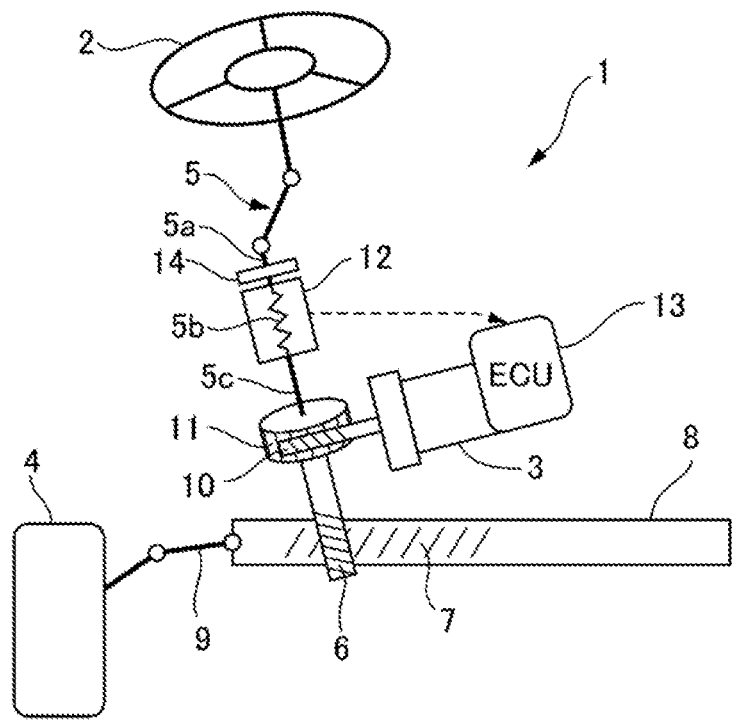
FIG. 1 is a configuration diagram of an electric power steering device 1 in a first embodiment of the present invention.

FIG. 1 is a configuration diagram of an electric power steering device 1 in a first embodiment of the present invention.

The electric power steering device 1 is configured to apply assist torque by an electric motor 3 to steering torque input to a steering wheel 2 by a driver, to thereby transmit, as a steering force, the steering torque and the assist torque to steered wheels 4. The electric motor 3 is a three-phase brushless motor. The steering torque input to the steering wheel 2 is transmitted from a steering shaft 5 to a pinion 6, and is converted to a thrust force of a rack bar 8 by a rack 7 meshing with the pinion 6. A linear motion of the rack bar 8 is transmitted to tie rods 9, to thereby steer the steered wheels 4. The steering shaft 5 includes an input shaft 5a, a torsion bar 5b, and a pinion shaft 5c. The input shaft 5a and the pinion shaft 5c can rotate relative to each other through torsion of the torsion bar 5b.

The assist torque output from the electric motor 3 is transmitted to the pinion 6 through a worm shaft 10 and a worm wheel 11. A torque sensor 12 configured to detect the steering torque is arranged on the steering shaft 5 across the input shaft 5a and the pinion shaft 5c. The torque sensor 12 is configured to output to the ECU 13 a signal corresponding to the steering torque. Moreover, a steering angle sensor 14 configured to detect an angle (steering angle) of the steering wheel 2 is arranged on the steering shaft 5. The steering angle sensor 14 is configured to output to the ECU 13 a signal corresponding to the steering angle. The ECU 13 is configured to execute power steering control of calculating a target assist torque in accordance with the steering torque, the steering angle, a vehicle speed, and the like, to thereby control electric power supplied to the electric motor 3 so that the output torque of the electric motor 3 reaches the target assist torque.

Figure 2:
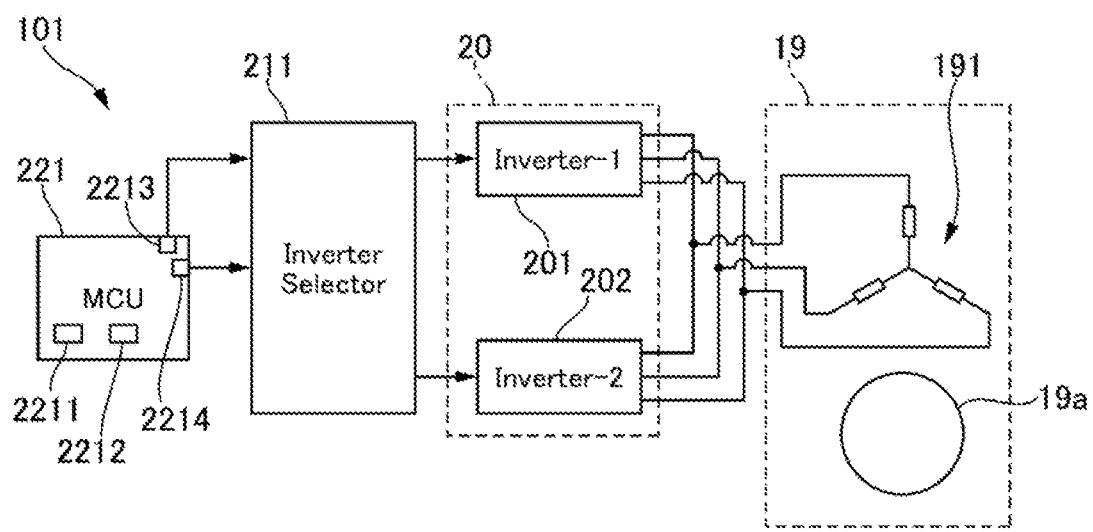
FIG. 2 is a configuration diagram of a motor control device 101 according to the first embodiment.

FIG. 2 is a configuration diagram of a motor control device 101 according to the first embodiment.

The motor control device 101 is configured to control drive of a brushless motor unit 19 of the electric motor 3.

The brushless motor unit 19 includes a first motor rotor 19a and a first stator coil 191. The first motor rotor 19a is a rotor, and is formed of a magnet. The first stator coil 191 is a stator, and is formed of three coils connected in the star configuration. The first stator coil 191 is configured to rotationally drive the first motor rotor 19a in accordance with voltages applied in the respective phases (U, V, and W phases) based on a PWM control law.

In the motor control device 101, each portion other than the brushless motor unit 19 is accommodated inside the ECU 13.

The multi-inverter unit 20 is configured to convert a DC voltage supplied from an in-vehicle battery to three-phase AC voltages (first motor drive signals), to thereby supply the three-phase AC voltages to the first stator coil 191. The multi-inverter unit 20 includes a first inverter unit 201 and a second inverter unit 202. The first inverter unit 201 includes a three-phase bridge circuit using two MOS FETs, which are switching elements, in each phase. Each MOS FET is controlled to turn on and off by a first PWM signal (first motor command signal) input to a control terminal (gate terminal) of the MOS FET. The same applies to the second inverter unit 202.

The first inverter selector 211 is configured to input the first PWM signals and the first selection signal (first inverter switching control signal) to the first PWM signals to one or both of the first inverter unit 201 and the second inverter unit 202 in accordance with information obtained from the first selection signal. The first selection signal is a signal containing information on whether or not the first PWM signals are to be output to the first inverter unit 201 and whether or not the first PWM signals are to be output to the second inverter unit 202.

A first microcomputer 211 is configured to generate the first PWM signals and the first selection signal, to thereby output those signals to the first inverter selector 211. The first microcomputer 221 includes a first selection signal generation unit (first inverter switching control signal generation unit) 2211, a first PWM signal generation unit (first motor command signal generation unit) 2212, a first output port 2213, and a second output port 2214.

The first selection signal generation unit 2211 is configured to generate the first selection signal in accordance with whether both of the inverter units 201 and 202 are normal. For example, the first selection signal generation unit 2211 is configured to generate the first selection signal so that the first PWM signals are output to a normal inverter unit of the inverter units 201 and 202, and the first PWM signals are not output to an inverter unit in which an abnormality has occurred.

The first PWM signal generation unit 2212 is configured to generate the first PWM signals for controlling the drive of the brushless motor unit 19 based on the PWM control law so that the output torque of the electric motor 3 reaches the target assist torque.

The first output port 2213 is configured to output the first selection signal, which is generated by the first selection signal generation unit 2211, to the first inverter selector 211.

The second output port 2214 is configured to output the first PWM signals, which are generated by the first PWM signal generation unit 2212, to the first inverter selector 211.

Description is now given of actions and effects of the first embodiment.

The motor control device 101 according to the first embodiment includes the first inverter selector 211 configured to be able to output the first PWM signals selectively or simultaneously to the first inverter unit 201 and the second inverter unit 202, and the first microcomputer 221 configured to output the first PWM signals and the first selection signal to the first inverter selector 211. The first selection signal contains the information on whether or not the first PWM signals are to be output to the first inverter unit 201 and whether or not the first PWM signals are to be output to the second inverter unit 202. With this configuration, in the multi-inverter unit 20, the inverter unit to which the first PWM signals are to be output can be switched by the first inverter selector 211. That is, the state in which the first PWM signals are output to both of the first inverter unit 201 and the second inverter unit 202 and the state in which the first PWM signals are output to only one thereof can be switched. Thus, for example, it is possible to select the output of the first PWM signals to both of the first inverter unit 201 and the second inverter unit 202 when high output is required, or to select the output of the first PWM signals to only one of the inverters 201 and 202 when the other one fails. As a result, the inverter units 201 and 202 can selectively or simultaneously be used based on the situations, and the motor drive control based on the situations can thus be achieved.

Figure 3:
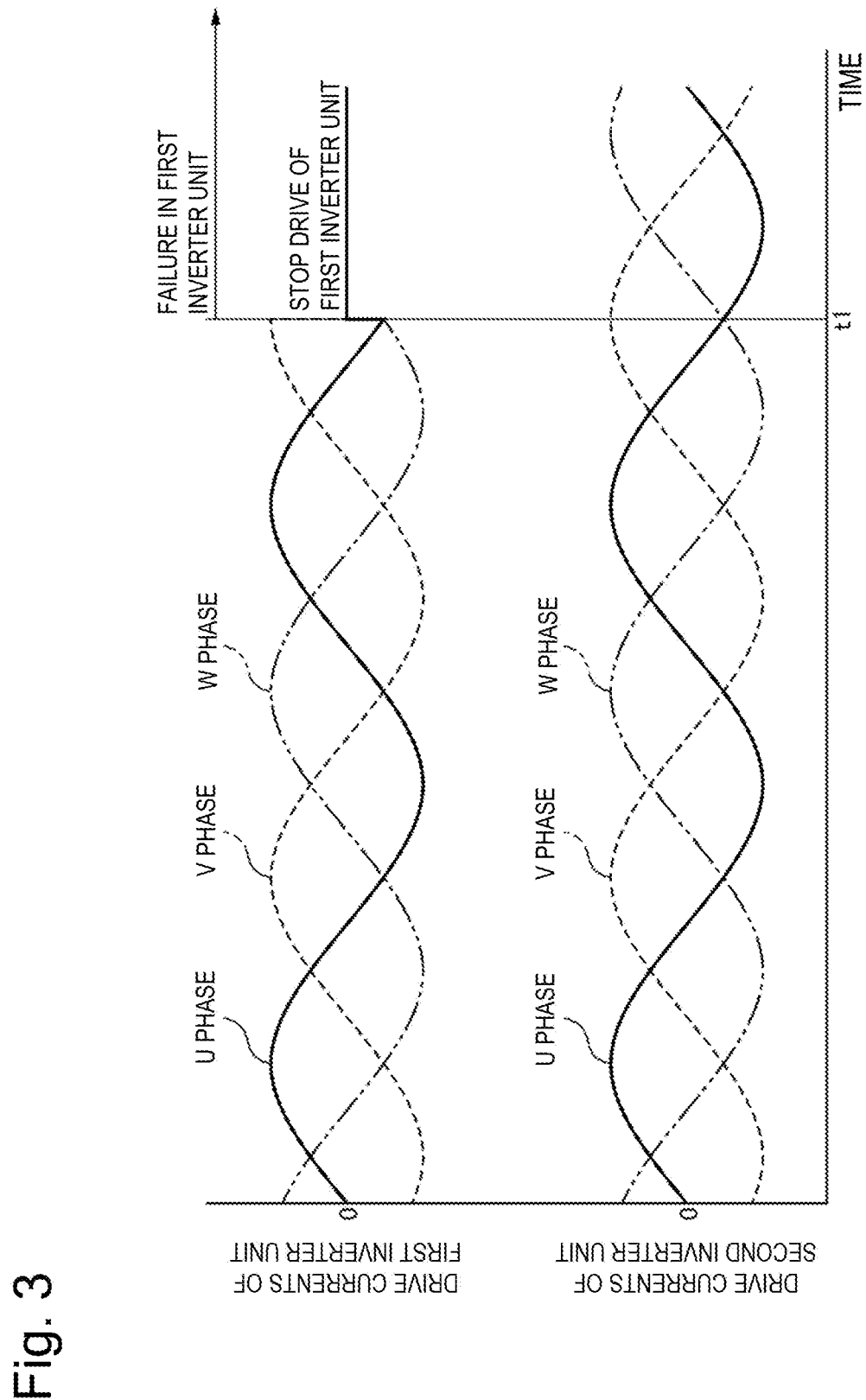
FIG. 3 is a graph for showing drive current waveforms of a second inverter unit 202 exhibited when a first inverter unit 201 fails in the first embodiment.

When an abnormality occurs in the first inverter unit 201, the first selection signal generation unit 2211 in the first embodiment outputs the first selection signal to the first inverter selector 211 so that the first PWM signals are not output from the first inverter selector 211 to the first inverter unit 201. With this configuration, as shown in FIG. 3, when the first inverter unit 201 fails at a time t1, the drive of the first inverter unit 201 is stopped. In this case, when the first PWM signals are output to the first inverter unit 201 in which the abnormality occurs, there is a fear in that noise may occur in the first inverter unit 201. Thus, influence of the error drive signal on the power steering control (malfunction of the electric motor 3 and the like) can be suppressed by stopping the output of the first PWM signals to the first inverter unit 201 in which the abnormality occurs. The same applies to a case in which an abnormality occurs in the second inverter unit 202, and the first selection signal is output to the first inverter selector 211 so that the first PWM signals are not output from the first inverter selector 211 to the second inverter unit 202.

Second Embodiment

A basic configuration of a second embodiment of the present invention is the same as that of the first embodiment. Therefore, description is only given of a difference from the first embodiment.

When an abnormality occurs in one of the inverter units 201 and 202, the first PWM signal generation unit 2212 increases a duty ratio of the first PWM signals compared with that in the normal state.

Figure 4:
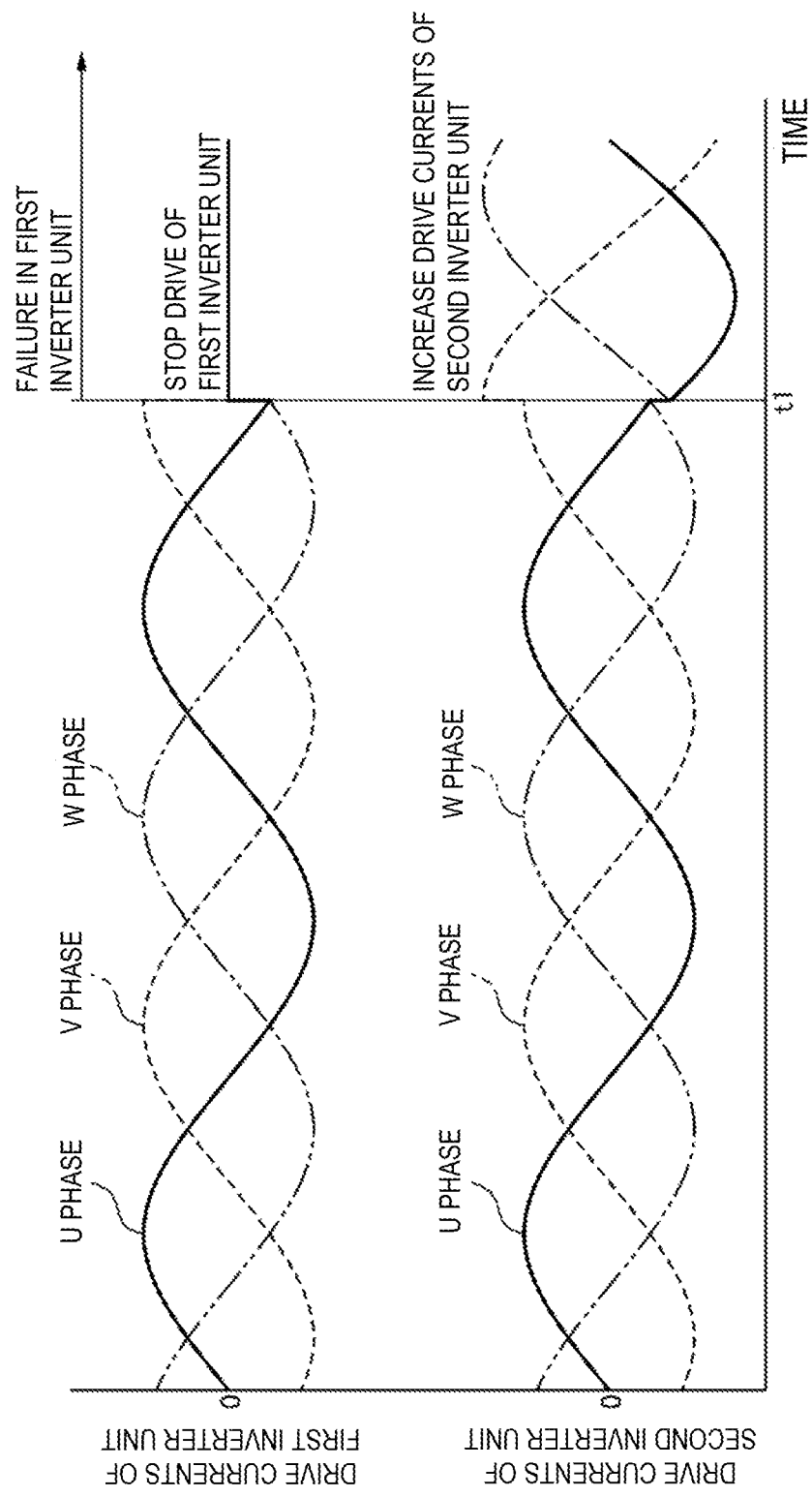
FIG. 4 is a graph for showing drive current waveforms of the second inverter unit 202 exhibited when the first inverter unit 201 fails in a second embodiment of the present invention.

FIG. 4 is a graph for showing drive current waveforms of the second inverter unit 202 exhibited when the first inverter unit 201 fails in the second embodiment. When the first inverter unit 201 fails at the time t1, the first PWM signal generation unit 2212 in the second embodiment increases the duty ratio of the first PWM signals compared with the duty ratio before the time t1, that is, before the failure. With this configuration, a decrease in output of the electric motor 3 caused by the stop of the drive by the first inverter unit 201 can be compensated for by the increase in drive currents by the second inverter unit 202. That is, the decrease in output of the electric motor 3 caused by the failure of the first inverter unit 201 can be suppressed. The same applies to a case in which the second inverter unit 202 fails, and the duty ratio of the first PWM signals is increased.

Third Embodiment

A basic configuration of a third embodiment of the present invention is the same as that of the first embodiment. Therefore, description is only given of a difference from the first embodiment.

Figure 5:
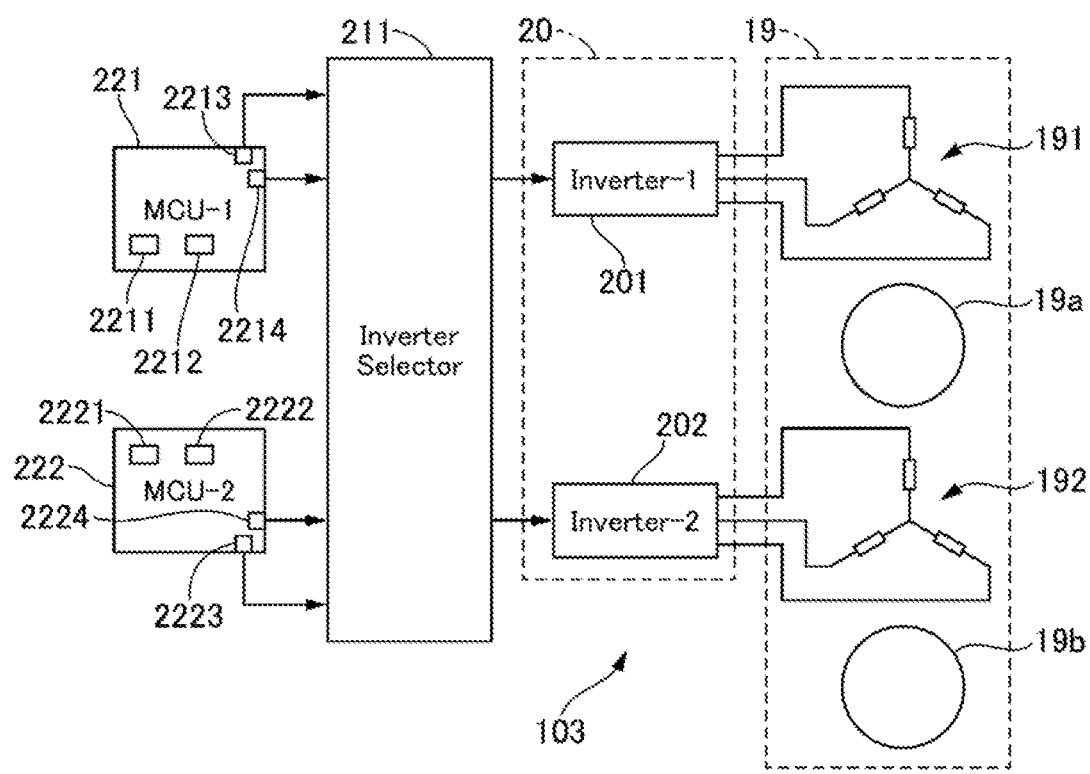
FIG. 5 is a configuration diagram of a motor control device 103 according to a third embodiment of the present, invention.

FIG. 5 is a configuration diagram of a motor control device 103 according to the third embodiment.

The brushless motor unit 19 includes a second motor rotor 19b and a second stator coil 192. The second motor rotor 19b has the same structure as that of the first motor rotor 19a. The second stator coil 192 has the same structure as that of the first stator coil 191. The second stator coil 192 is configured to rotationally drive the second motor rotor 19b in accordance with voltages applied in the respective phases (U, V, and W phases) based on the PWM control law. The second motor rotor 19b and the second stator coil 192 are accommodated in a housing different from that for the first motor rotor 19a and the first stator coil 191. That is, the motor control device 103 according to the third embodiment includes the two brushless motors as the electric motor 3. The first stator coil 191 and the second stator coil 192 may be accommodated in the same housing, and may be configured to rotationally drive the common motor rotor (first motor rotor 19a).

The second inverter unit 202 is configured to convert the DC voltage supplied from the in-vehicle battery to three-phase AC voltages (second motor drive signals), to thereby supply the three-phase AC voltages to the second stator coil 192. Each MOS FET of the second inverter unit 202 is controlled to turn on and off by a second PWM signal (second motor command signal) input to a control terminal (gate terminal) of the MOS FET.

The first inverter selector 211 is configured to input the first PWM signals and the first selection signal or the second PWM signals and a second selection signal, and output the PWM signals to one or both of the first inverter unit 201 and the second inverter unit 202 in accordance with information obtained from the input selection signals. The second selection signal is a signal containing information on whether or not the second PWM signals are to be output to the first inverter unit 201 and whether or not the second PWM signals are to be output to the second inverter unit 202.

A second microcomputer 222 is configured to generate the second PWM signals and the second selection signal, to thereby output those signals to the first inverter selector 211. The second microcomputer 222 includes a second selection signal generation unit (second inverter switching control signal generation unit) 2221, a second PWM signal generation unit (second motor command signal generation unit) 2222, a first output port 2223, and a second output port 2224.

The second selection signal generation unit 2221 is configured to generate the second selection signal in accordance with whether both of the inverter units 201 and 202 are normal. For example, the second selection signal generation unit 2221 is configured to generate the second selection signal so that the second PWM signals are output to a normal inverter unit of the inverter units 201 and 202, and the second PWM signals are not output to an inverter unit, in which an abnormality has occurred.

The second PWM signal generation unit 2222 is configured to generate the second PWM signals for controlling the drive of the brushless motor unit 19 based on the PWM control law so that the output torque of the electric motor 3 is the target assist torque. The second PWM signal is the same as the first PWM The first output port 2223 is configured to output the second selection signal, which is generated by the second selection signal generation unit 2221, to the first inverter selector 211.

The second output port 2224 is configured to output the second PWM signals, which are generated by the second PWM signal generation unit 2222, to the first inverter selector 211.

The first microcomputer 221 and the second microcomputer 222 mutually monitor each other. When both of the microcomputers 221 and 222 are normally operating, one of the microcomputers outputs the PWM signals and the selection signal, and the other microcomputer does not output the PWM signals and the selection signal. Moreover, when an abnormality occurs in the one microcomputer, the other microcomputer outputs the PWM signals and the selection signal.

In the motor control device 103 according to the third embodiment, the microcomputers have the redundant configuration formed of the first microcomputer 221 and the second microcomputer 222. Therefore, it is possible to achieve, for example, the mutual monitoring between the microcomputers 221 and 222, and the continuation of the power steering control by one microcomputer when another microcomputer fails, to thereby be able to increase safety of the electric power steering device 1.

The stator coil of the brushless motor unit 19 has the redundant configuration formed of the first stator coil 191 and the second stator coil 192. Therefore, the rotational drive of the electric motor 3 can be continued by one stator coil when another stator coil fails.

Fourth Embodiment

A basic configuration of a fourth embodiment of the present invention is the same as that of the third embodiment. Therefore, description is only given of a difference from the third embodiment.

Figure 6:
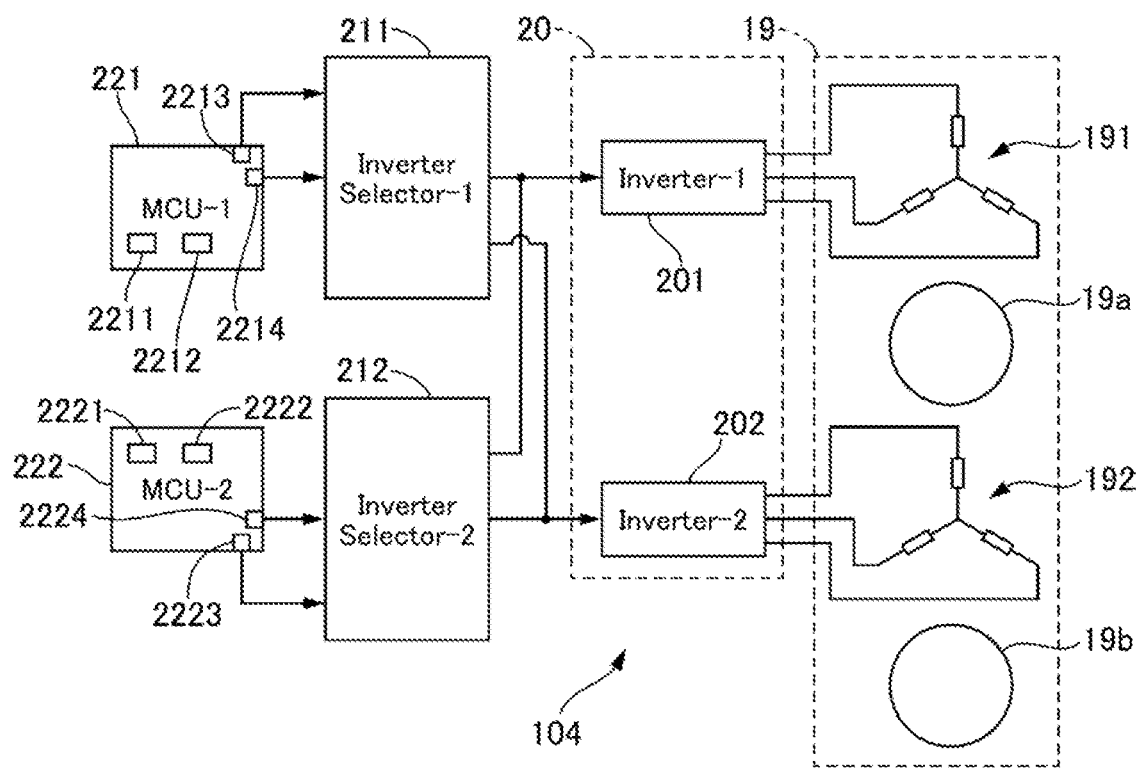
FIG. 6 is a configuration diagram of a motor control device 104 according to a fourth embodiment of the present invention.

FIG. 6 is a configuration diagram of a motor control device 104 according to the fourth embodiment.

A second inverter selector (second inverter switching control unit) 212 is configured to input the second PWM signals and the second selection signal, and to output the second PWM signals to one or both of the first inverter unit 201 and the second inverter unit 202 in accordance with information obtained from the second selection signal.

The first output port 2223 is configured to output the second selection signal, which is generated by the second selection signal generation unit 2221, to the second inverter selector 212.

The second output port 2224 is configured to output the second PWM signals, which are generated by the second PWM signal generation unit 2222, to the second inverter selector 212.

In the motor control device 104 according to the fourth embodiment, the inverter selectors have the redundant configuration formed of the first inverter selector 211 and the second inverter selector 212. Therefore, when one inverter selector fails, another inverter selector can output the first PWM signals or the second PWM signals to the first inverter unit 201 and the second inverter unit 202. As a result, it is possible to achieve, for example, the continuation of the power steering control, and the safety of the electric power steering device 1 can thus be increased.

Fifth Embodiment

A basic configuration of a fifth embodiment of the present invention is the same as that of the fourth embodiment. Therefore, description is only given of a difference from the fourth embodiment.

Figure 7:
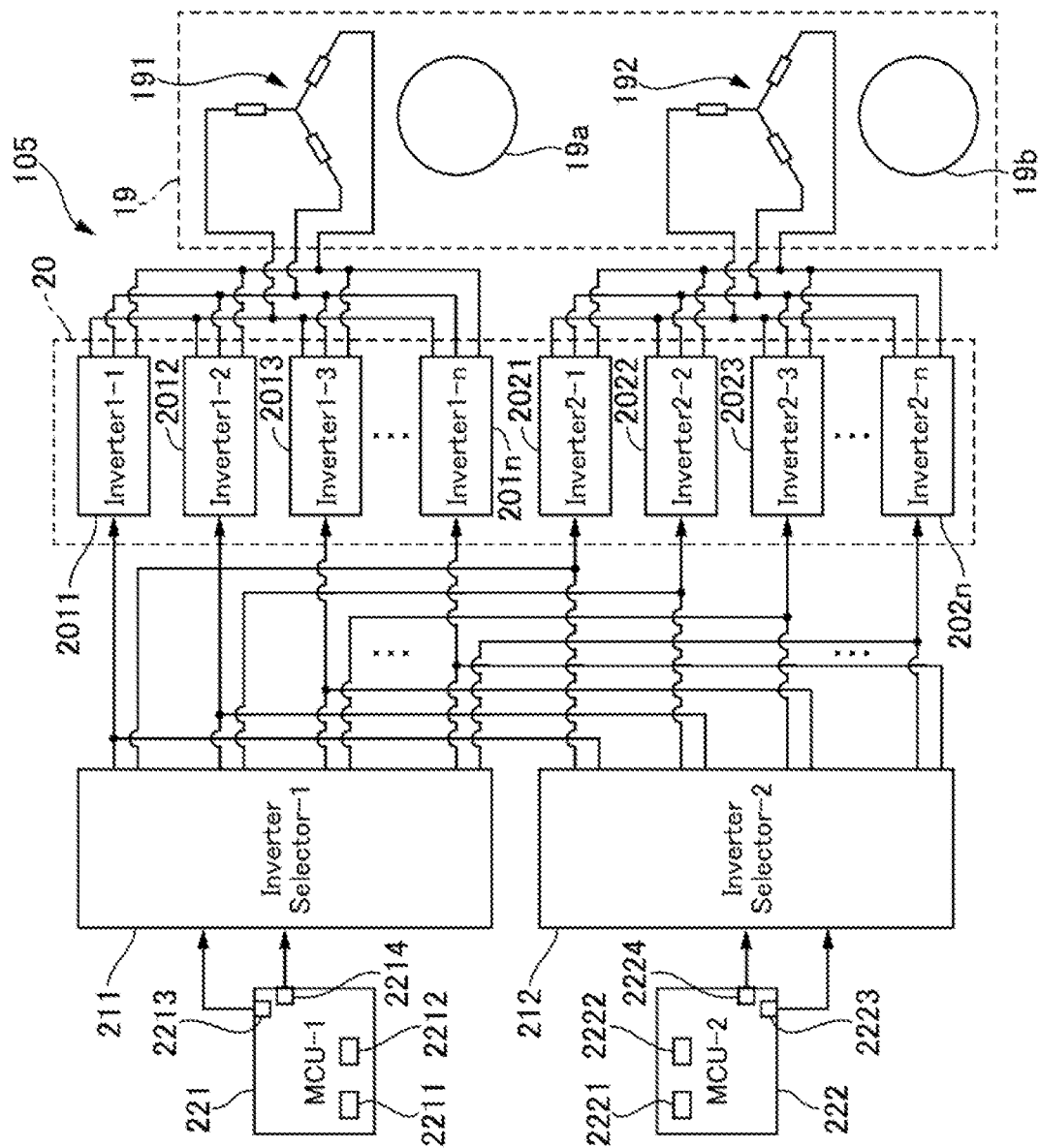
FIG. 7 is a configuration diagram of a motor control device 105 according to a fifth embodiment of the present invention.

FIG. 7 is a configuration diagram of a motor control device 105 according to the fifth embodiment.

The multi-inverter unit 20 includes "n" ("n" is a positive integer) first inverter units 2011, 2012, 2013, ..., 201n, and "n" second inverter units 2021, 2022, 2023, ..., 202n.

The first inverter selector 211 is configured to be able to selectively output the first PWM signals to all of the inverter units 2011, 2012, 2013, ..., 201n, and 2021, 2022, 2023, ..., 202n of the multi-inverter unit 20.

The second inverter selector 212 is configured to be able to selectively output the second PWM signals to all of the inverter units 2011, 2012, 2013, ..., 201n, and 2021, 2022, 2023, ..., 202n of the multi-inverter unit 20.

When an abnormality occurs in one of the first inverter units 2011, 2012, 2013, ..., 201n, the first PWM signal generation unit 2212 increases the duty ratio of the first PWM signals compared with that in the normal state.

When an abnormality occurs in one of the second inverter units 2021, 2022, 2023, ..., 202n, the second PWM signal generation unit 2222 increases the duty ratio of the second PWM signals compared with that in the normal state.

In the motor control device 105 according, to the fifth embodiment, the first inverter selector 211 and the second inverter selector 212 can output the PWM signals to all of the inverter units 2011, 2012, 2013, ..., 201n, and 2021, 2022, 2023, ..., 202n. With this configuration, even when a failure occurs in one of the first inverter selector 211 and the second inverter selector 212, another inverter selector can output the first PWM signals or the second PWM signals to all of the inverter units 2011, 2012, 2013, ..., 201n, and 2021, 2022, 2023, ..., 202n. As a result, it is possible to achieve, for example, the continuation of the power steering control, and the safety of the electric power steering device 1 can thus be increased.

Figure 8:
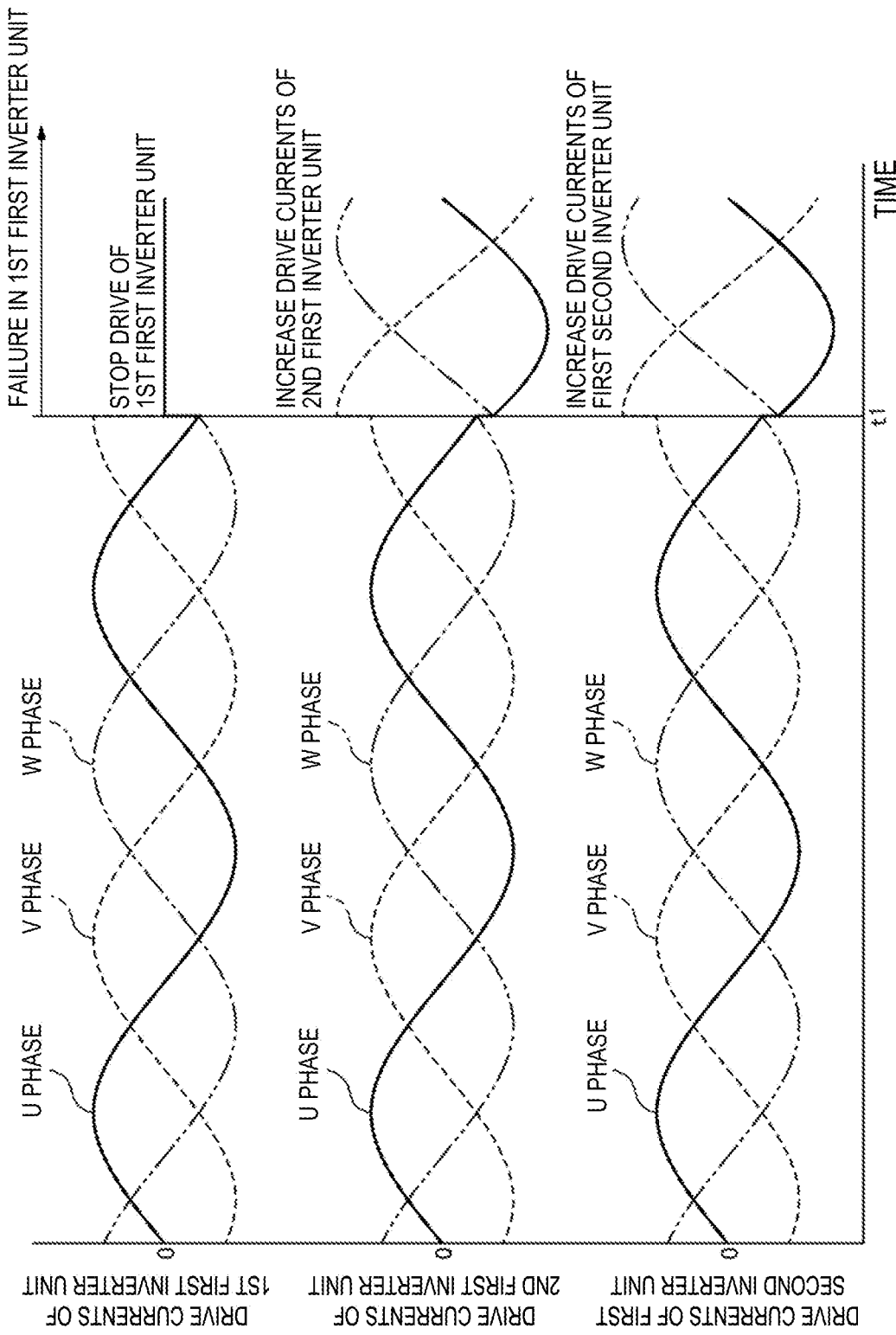
FIG. 8 is a graph for showing drive current waveforms of other inverter units exhibited when a 1st first inverter unit 2011 fails in the fifth embodiment.

FIG. 8 is a graph for showing drive current waveforms of other inverter units (2nd first inverter unit 2012 and 1st second inverter unit 2021) exhibited when the 1st first inverter unit 2011 fails in the fifth embodiment. When the 1st first inverter unit 2011 fails at the time t1, the duty ratio of the first PWM signals is increased compared with the duty ratio before the time t1, that is, before the failure. With this configuration, a decrease in output of the electric motor 3 caused, by the stop of the drive by the 1st first inverter unit 2011 can be compensated for by the increase in drive currents by all of the remaining inverter units. That is, the decrease in output of the electric motor 3 caused by the failure of the 1st first inverter unit 2011 can be suppressed. Moreover, the required output can uniformly be distributed to and covered by all of the normal inverter units, and a capacity of each inverter unit can thus be reduced. The same configuration is provided also when the 1st second inverter unit 2021 fails. The duty ratio of the second PWM signals is increased, to thereby be able to suppress a decrease in output of the electric motor 3 caused by the failure of the 1st second inverter unit 2021.

Sixth Embodiment

A basic configuration of a sixth embodiment of the present invention is the same as that of the fifth embodiment. Therefore, description is only given of a difference from the fifth embodiment.

Figure 9:
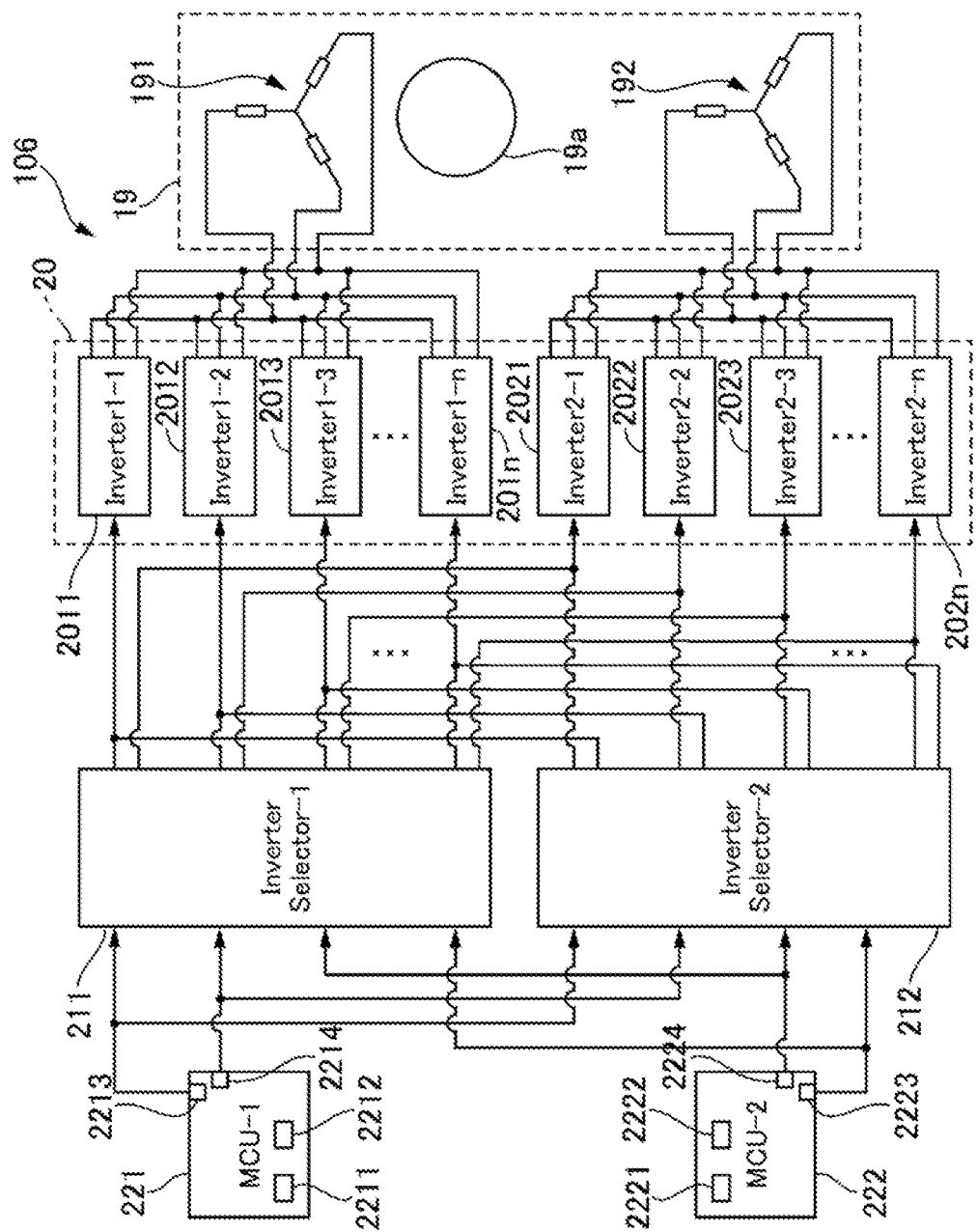
FIG. 9 is a configuration diagram of a motor control device 106 according to a sixth embodiment of the present invention.

FIG. 9 is a configuration diagram of a motor control device 106 according to the sixth embodiment.

The first microcomputer 221 is configured to be able to output the first PWM signals and the first selection signal to the second inverter selector 212.

The second microcomputer 222 is configured to be able to output the second PWM signals and the second selection signal to the first inverter selector 211. The second microcomputer 222 is configured to output the second PWM signals at timings shifted (for example, by 30 degrees in phase) from timings at which the first microcomputer 221 outputs the first PWM signals.

The first inverter selector 211 is configured to input the first PWM signals and the first selection signal, and to output the first PWM signals to one or both of the first inverter units 2011, 2012, 2013, ..., 201n and the second inverter units 2021, 2022, 2023, ..., 202n in accordance with information obtained from the first selection signal. When an abnormality occurs in the first microcomputer 221, the first inverter selector 221 inputs the second PWM signals and the second selection signal, and outputs the second PWM signals to one or both of the first inverter units 2011, 2012, 2013, ..., 201n and the second inverter units 2021, 2022, 2023, ..., 202n in accordance with information obtained from the second selection signal.

The second inverter selector 212 is configured to input the second PWM signals and the second selection signal, and to output the second PWM signals to one or both of the first inverter units 2011, 2012, 2013, ..., 201n and the second inverter units 2021, 2022, 2023, ..., 202n in accordance with information obtained from the second selection signal. When an abnormality occurs in the second microcomputer 222, the second inverter selector 212 inputs the first PWM signals and the first selection signal, and outputs the second PWM signals to one or both of the first inverter units 2011, 2012, 2013, . . . , 201n and the second inverter units 2021, 2022, 2023, . . . , 202n in accordance with information obtained from the first selection signal.

The first stator coil 191 and the second stator coil 192 of the brushless motor unit 19 in the sixth embodiment are accommodated in the same housing, and are configured to rotationally drive the common first motor rotor 19a. That is, the first stator coil 191 and the second stator coil 192 are provided outside the first motor rotor 19a in a radial direction thereof. The first motor rotor 19a is rotationally driven through use of magnetic fields formed by the respective stator coils 191 and 192. The first stator coil 191 and the second stator coil 192 may be arranged side by side in an axial direction of the first motor rotor 19a or in the radial direction of the first motor rotor 19a.

In the motor control device 106 according to the sixth embodiment, the first microcomputer 221 is configured to be able to output the first PWM signals to the second inverter selector 212, and the second microcomputer 222 is configured to be able to output the second PWM signals to the first inverter selector 211. With this configuration, when one of the first inverter selector 211 and the second inverter selector 212 fails, and the control of another inverter selector is to be continued, the first microcomputer 221 and the second microcomputer 222 use PWM signals different from each other, to thereby be able to continue the control of the drive of the multi-inverter unit 20.

Figure 10:
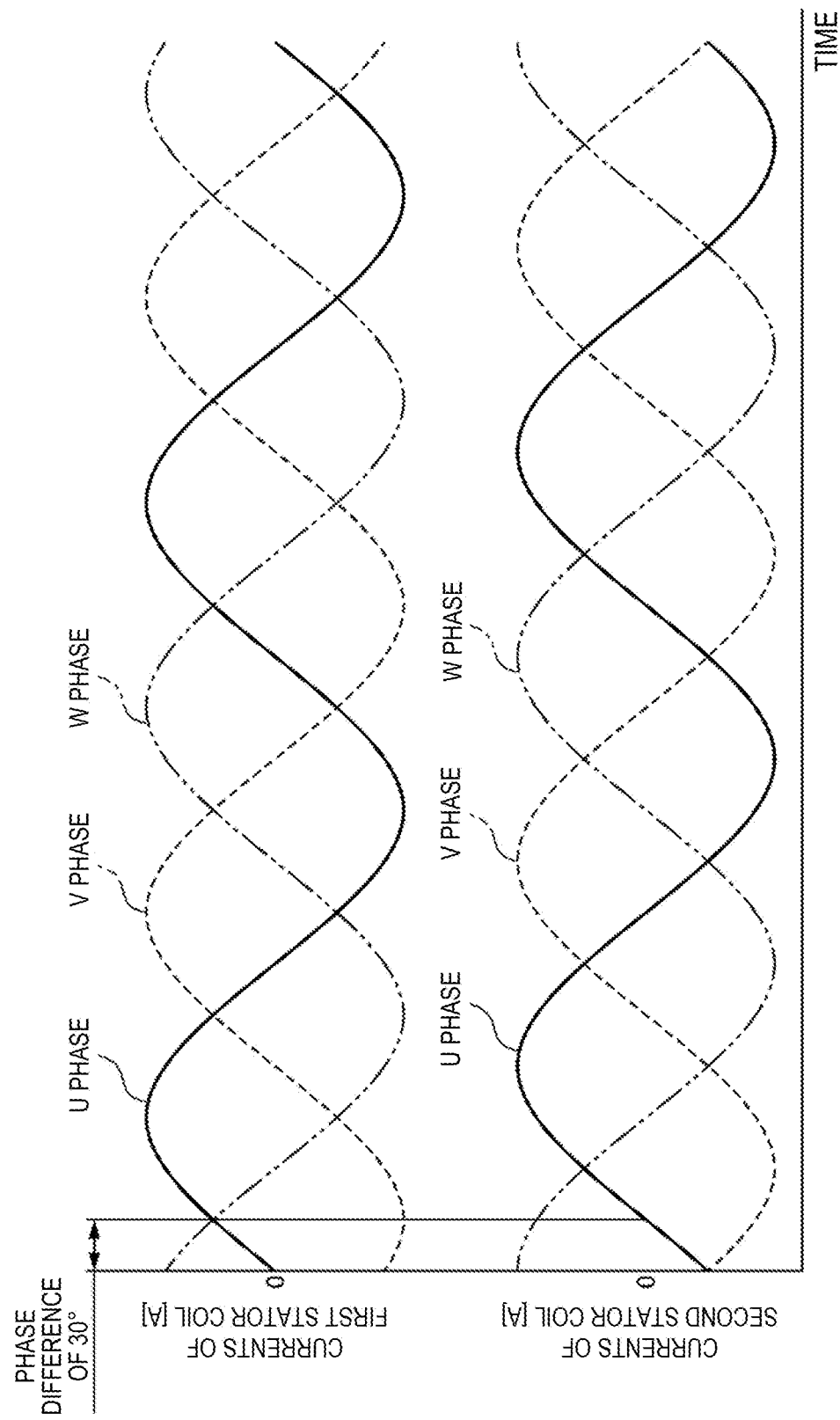
FIG. 10 is a graph for showing current waveforms of a first stator coil 191 and current waveforms of a second stator coil 192 in the sixth embodiment.

The second microcomputer 222 is configured to output the second PWM signals at the timings shifted from the timings at which the first microcomputer 221 outputs the first PWM signals. The first stator coil 191 and the second stator coil 192 of the brushless motor unit 19 rotationally drive the common first motor rotor 19a through use of the magnetic field formed by each of the first stator coil 191 and the second stator coil 192. FIG. 10 is a graph for showing current waveforms of the first stator coil 191 and current waveforms of the second stator coil 192. The current waveforms of the first stator coil 191 are advanced by 30° in phase with respect to the current waveforms of the second stator coil 192. With this configuration, torque ripples accompanying the output torque generated by the first stator coil 191 and torque ripples accompanying the output torque generated by the second stator coil 192 act so as to cancel each other. As a result, the torque ripples of the electric motor 3 can be reduced, and noise, vibration, and degradation in controllability caused by the torque ripples can thus be suppressed.

Seventh Embodiment

A basic configuration of a seventh embodiment of the present invention is the same as that of the sixth embodiment. Therefore, description is only given of a difference from the sixth embodiment.

Figure 11:
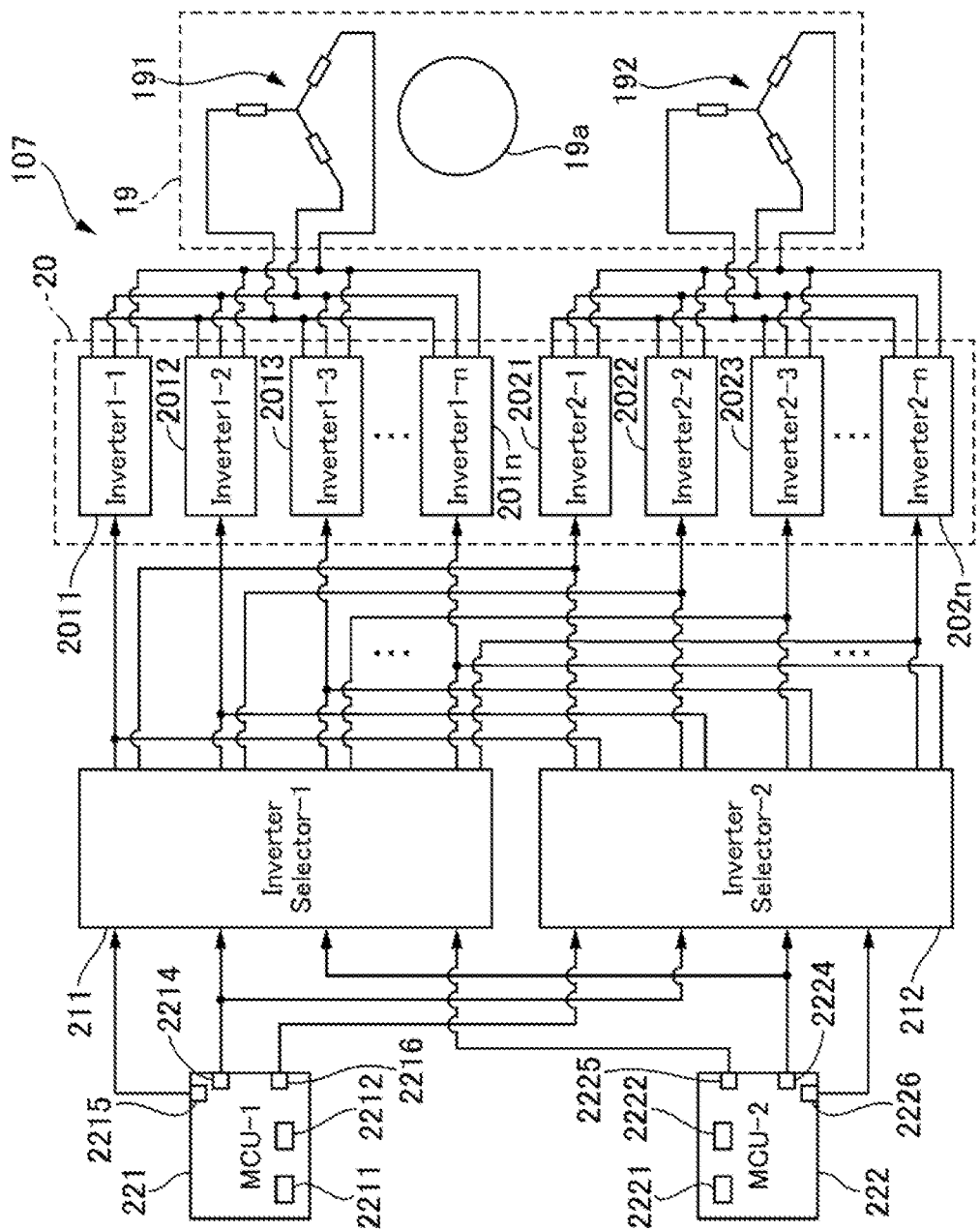
FIG. 11 is a configuration diagram of a motor control device 107 according to a seventh embodiment of the present invention.

FIG. 11 is a configuration diagram of a motor control device 107 according to the seventh embodiment.

The first microcomputer 221 includes a 1st first output port (1st first-microcomputer output port) 2215 and a 2nd first output port (2nd first-microcomputer output port) 2216. The 1st first output port 2215 is configured to output the first PWM signals to the first inverter selector 211. The 2nd first output port 2216 is configured to output the first PWM signals to the second inverter selector 212.

The second microcomputer 222 includes a 1st first output port (1st second-microcomputer output port) 2225 and a 2nd first output port (2nd second-microcomputer output port) 2226. The 1st first output port 2225 is configured to output the second PWM signals to the first inverter selector 211. The 2nd first output port 2226 is configured to output the second PWM signals to the second inverter selector 212.

In the motor control device 107 according to the seventh embodiment, the first microcomputer 221 is configured to be able to output the first PWM signals to the first inverter selector 211 and the second inverter selector 212, and the second microcomputer 222 is configured to be able to output the second PWM signals to the first inverter selector 211 and the second inverter selector 212. With this configuration, when one of the first inverter selector 211 and the second inverter selector 212 fails, and the control of another inverter selector is continued, the first microcomputer 221 and the second microcomputer 222 use the PWM signals different from each other, to thereby be able to continue the control of the multi-inverter unit 20.

Eighth Embodiment

A basic configuration of an eighth embodiment of the present invention is the same as that of the third embodiment. Therefore, description is only given of a difference from the third embodiment.

Figure 12:
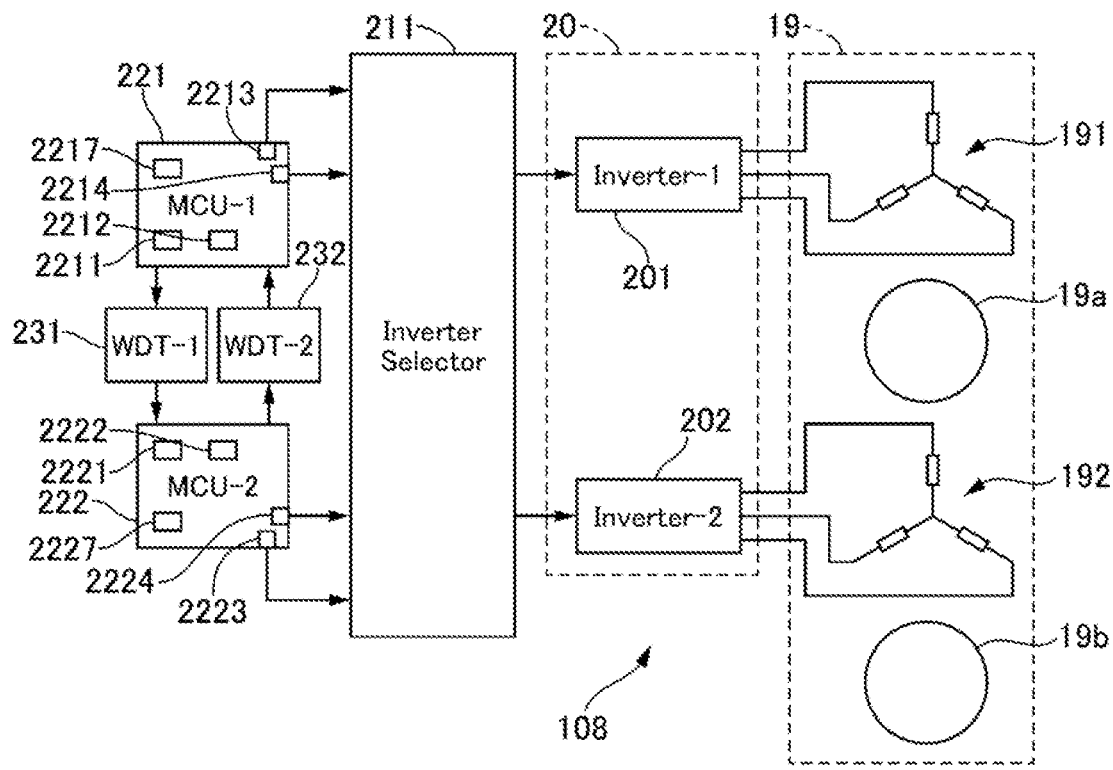
FIG. 12 is a configuration diagram of a motor control device 108 according to an eighth embodiment of the present invention.

FIG. 12 is a configuration diagram of a motor control device 108 according to the eighth embodiment.

The motor control device 108 includes a first watchdog timer 231 and a second watchdog timer 232.

The first watchdog timer 231 is a hardware timer, and is configured to be cleared by a first clear signal output from the first microcomputer 221 at certain cycles. When the first watchdog time 231 is not cleared within the certain cycle, the first watchdog timer 231 outputs an overflow signal to the second microcomputer 222. When the second microcomputer 222 inputs the overflow signal from the first watchdog timer 231, the second microcomputer 222 determines that an abnormality occurs in the first microcomputer 221.

The first microcomputer 221 includes a first watchdog timer signal output unit 2217 configured to output the first clear signal at certain cycles.

The second watchdog timer 232 is a hardware timer, and is configured to be cleared by a second clear signal output from the second microcomputer 222 at certain cycles. When the second watchdog time 232 is not cleared within the certain cycle, the second watchdog timer 232 outputs an overflow signal to the first microcomputer 221. When the first microcomputer 221 inputs the overflow signal from the second watchdog timer 232, the first microcomputer 221 determines that an abnormality occurs in the second microcomputer 222.

The second microcomputer 222 includes a second watchdog timer signal output unit 2227 configured to output the second clear signal at certain cycles.

In the motor control device 108 according to the eighth embodiment, the first microcomputer 221 diagnoses whether or not an abnormality of the second microcomputer 222 exists based on whether or not the overflow signal from the second watchdog timer 232 exists, and the second microcomputer 222 diagnoses whether or not an abnormality of the first microcomputer 221 exists based on whether or not the overflow signal from the first watchdog timer 231 exists.

With this configuration, the mutual monitoring is facilitated between the first microcomputer 221 and the second microcomputer 222, to thereby be able to increase the safety of the electric power steering device 1.

Ninth Embodiment

A basic configuration of a ninth embodiment of the present invention is the same as that of the first embodiment. Therefore, description is only given of a difference from the first embodiment.

Figure 13:
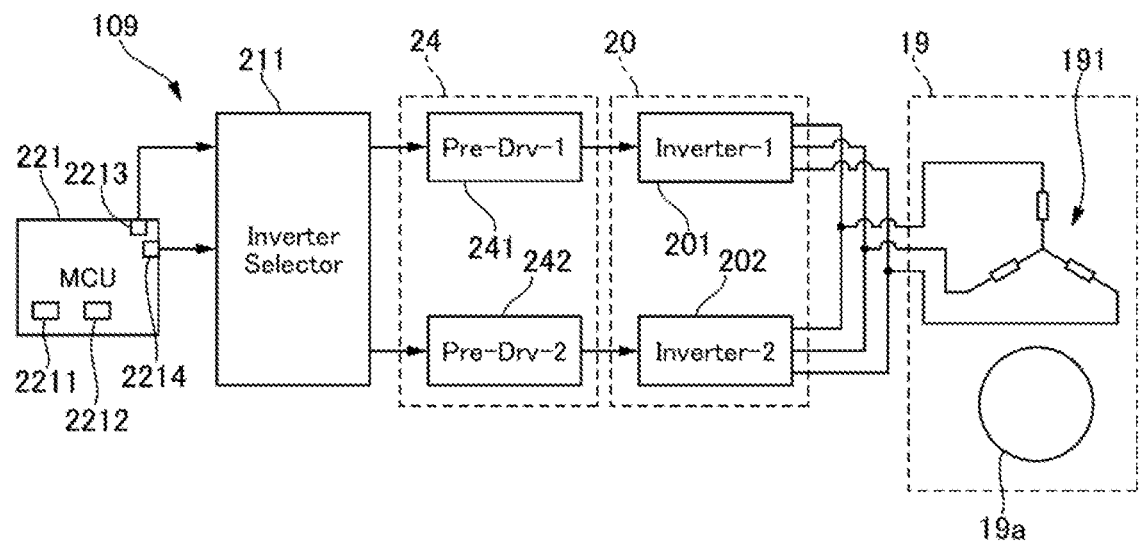
FIG. 13 is a configuration diagram of a motor control device 109 according to a ninth embodiment of the present invention.

FIG. 13 is a configuration diagram of a motor control device 109 according to the ninth embodiment.

The motor control device 109 includes a pre-driver unit 24. The pre-driver unit 24 is arranged between the first inverter selector 211 and the multi-inverter unit 20. The pre-driver unit 24 includes a first pre-driver 241 and a second pre-driver 242. The first pre-driver 241 is configured to control the drive of the first inverter unit 201 based on the first PWM signals. Specifically, the first pre-driver 241 is configured to amplify the first PWM signals, to thereby output the amplified first PWM signals to the control terminals of the respective MOS FETs of the first inverter unit 201. The second pre-driver 242 is configured to control the drive of the second inverter unit 202 based on the first PWM signals. Specifically, the second pre-driver 242 is configured to amplify the first PWM signals, to thereby output the amplified first PWM signals to the control terminals of the respective MOS FETs of the second inverter unit 202.

The motor control device 109 according to the ninth embodiment includes the pre-driver unit 24 between the first inverter selector 211 and the multi-inverter unit 20. With this configuration, a voltage exceeding the PWM output of the first microcomputer 221 can be supplied to the multi-inverter unit 20, and the output of the brushless motor unit 19 can thus be increased.

The pre-driver unit 24 includes the first pre-driver 241 configured to be able to control the drive of the first inverter unit 201 based on the first PWM signals and the second pre-driver 242 configured to be able to control the drive of the second inverter unit 202 based on the first PWM signals. With this configuration, each pre-driver and each inverter unit have a one-to-one relationship, and a capacity of the pre-driver can be reduced.

Tenth Embodiment

A basic configuration of a tenth embodiment of the present invention is the same as that of the first embodiment. Therefore, description is only given of a difference from the first embodiment.

Figure 14:
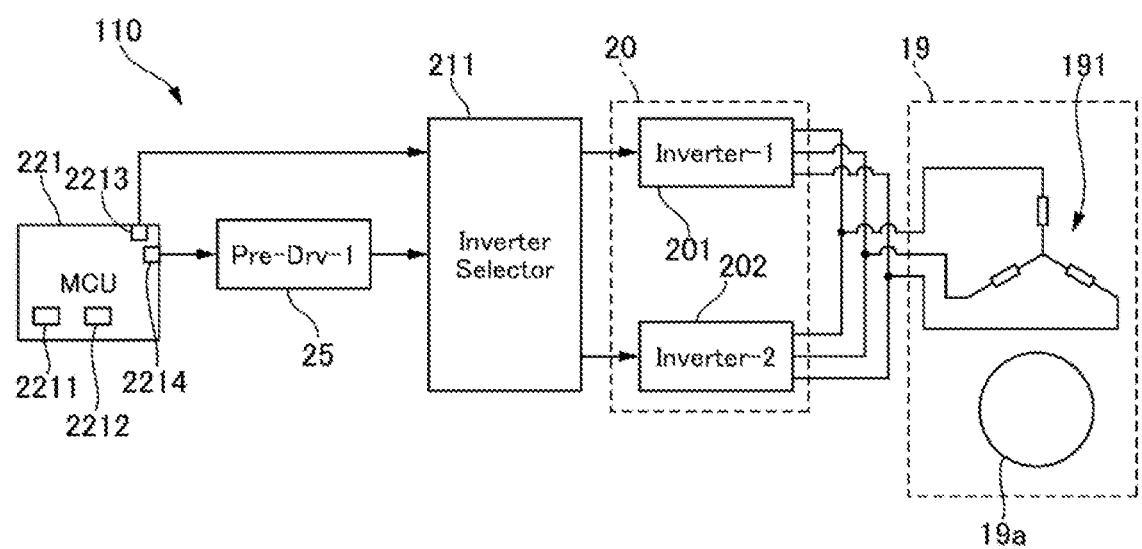
FIG. 14 is a configuration diagram of a motor control device 110 according to a tenth embodiment of the present invention.

FIG. 14 is a configuration diagram of a motor control device 110 according to the tenth embodiment.

The motor control device 110 includes a pre-driver unit 25. The pre-driver unit 25 is arranged between the first microcomputer 221 and the first inverter selector 211. The pre-driver unit 25 is configured to control the drive of the first inverter unit 201 based on the first PWM signals. Specifically, the pre-driver unit 25 is configured to amplify the first PWM signals, to thereby output the amplified first PWM signals to the first inverter selector 211.

The motor control device 110 according to the tenth embodiment includes the pre-driver unit 25 between the first microcomputer 221 and the first inverter selector 211. With this configuration, a voltage exceeding the PWM output of the first microcomputer 211 can be supplied to the multi-inverter unit 20, and the output of the brushless motor unit 19 can thus be increased.

The pre-driver unit 25 is provided on an upstream side (first microcomputer 221 side) with respect to the first inverter selector 211, and an increase in number of pre-drivers can thus be suppressed compared with a case in which the pre-drivers are provided on a downstream side (multi-inverter unit 20 side) with respect to the first inverter selector 211.

Eleventh Embodiment

A basic configuration of an eleventh embodiment of the present invention is the same as that of the fourth embodiment. Therefore, description is only given of a difference from the fourth embodiment.

Figure 15:
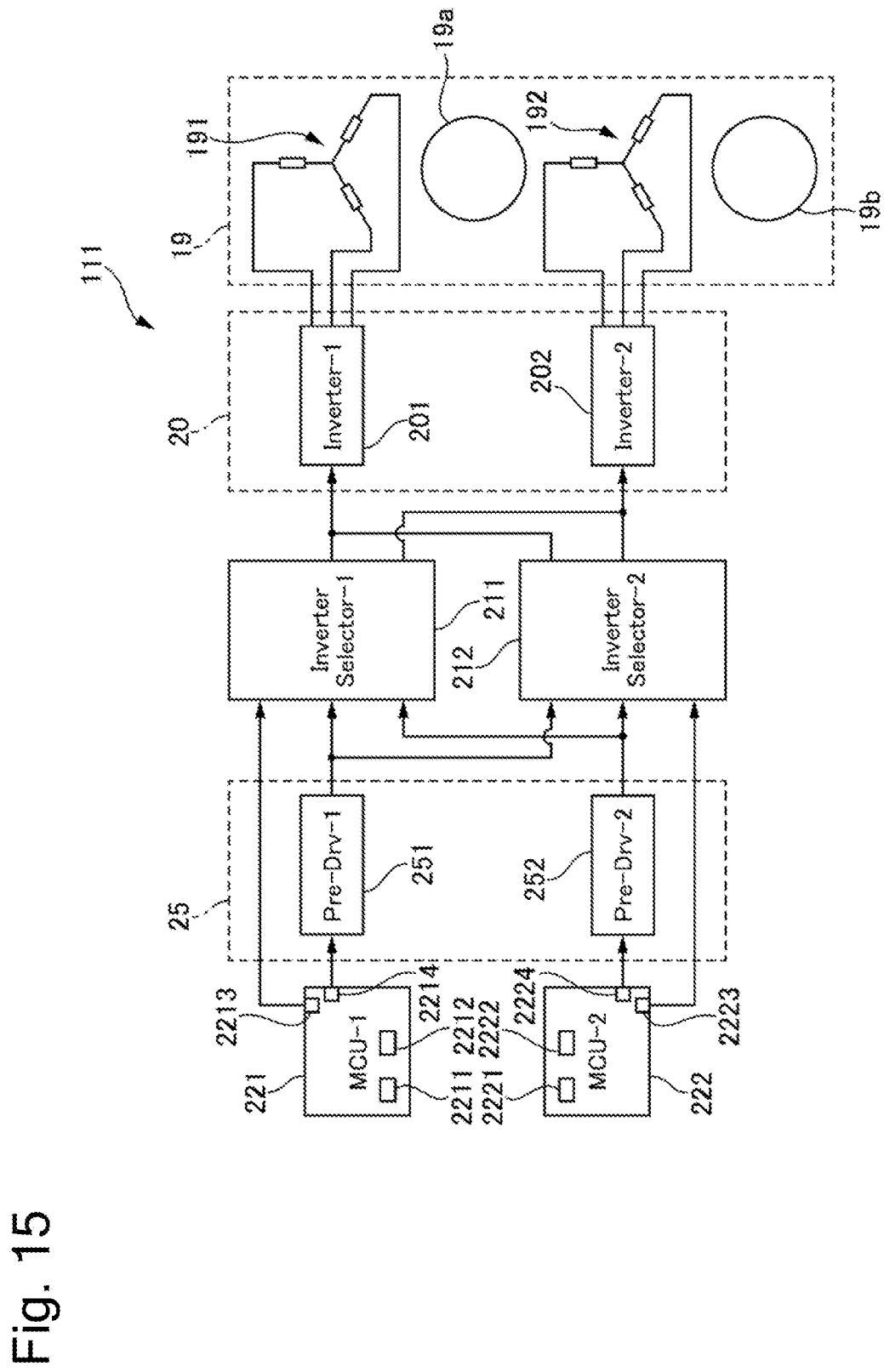
FIG. 15 is a configuration diagram of a motor control device 111 according to an eleventh embodiment of the present invention.

FIG. 15 is a configuration diagram of a motor control device 111 according to the eleventh embodiment.

The motor control device 111 includes the pre-driver unit 25. The pre-driver unit 25 includes a first pre-driver 251 and a second pre-driver 252.

The pre-driver 251 is provided between the first microcomputer 221 and the first inverter selector 211. The first pre-driver 251 is configured to control the drive of the first inverter unit 201 and the second inverter unit 202 based on the first PWM signals.

Specifically, the first pre-driver 251 is configured to amplify the first PWM signals, to thereby output the amplified first PWM signals to the first inverter selector 211 and the second inverter selector 212. The pre-driver 252 is provided between the second microcomputer 222 and the second inverter selector 212. The second pre-driver 252 is configured to control the drive of the first inverter unit 201 and the second inverter unit 202 based on the second PWM signals. Specifically, the second pre-driver 252 is configured to amplify the second PWM signals, to thereby output the amplified second PWM signals to the first inverter selector 211 and the second inverter selector 212.

In the motor control device 111 according to the eleventh embodiment, the pre-drivers have the redundant configuration formed of the first pre-driver 251 and the second pre-driver 252. Therefore, when one pre-driver fails, another pre-driver can output the first PWM signals or the second PWM signals to the first inverter selector 211 and the second inverter selector 212. As a result, it is possible to achieve, for example, the continuation of the power steering control, and the safety of the electric power steering device 1 can thus be increased.

Twelfth Embodiment

A basic configuration of a twelfth embodiment of the present invention is the same as that of the eleventh embodiment. Therefore, description is only given of a difference from the eleventh embodiment.

Figure 16:
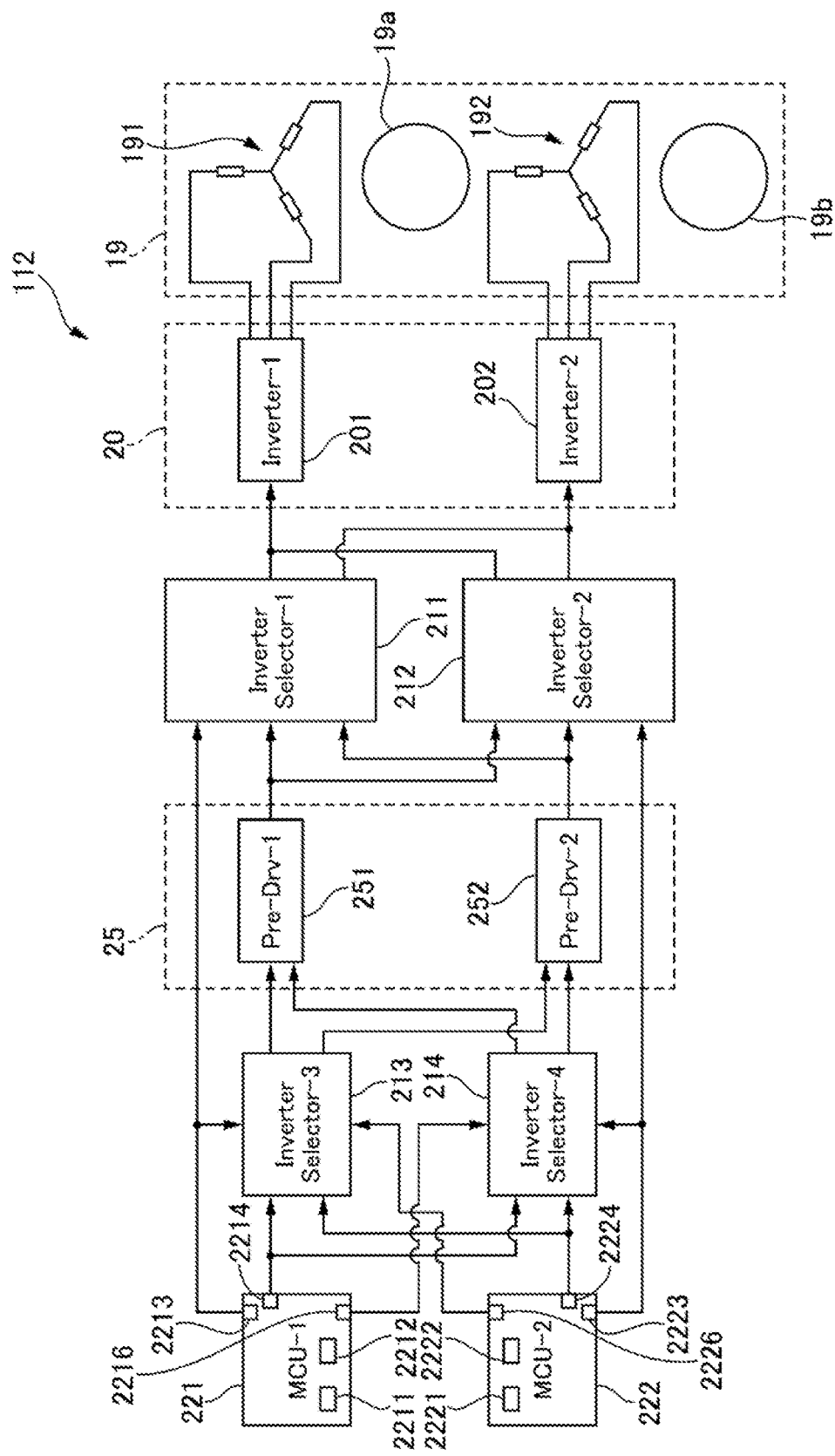
FIG. 16 is a configuration diagram of a motor control device 112 according to a twelfth embodiment of the present invention.

FIG. 16 is a configuration diagram of a motor control device 112 according to the twelfth embodiment.

The motor control device 112 includes a third inverter selector 213 and a fourth inverter selector 214.

The third inverter selector 213 is configured to input the first PWM signals and the first selection signal, and to output the first PWM signals to one or both of the first pre-driver 251 and the second pre-driver 252 in accordance with information obtained from the first selection signal. When an abnormality occurs in the first microcomputer 221, the third inverter selector 213 inputs the second PWM signals and the second selection signal, and outputs the second PWM signals to one or both of the first pre-driver 251 and the second pre driver 252 in accordance with information obtained from the second selection signal.

The fourth inverter selector 214 is configured to input the second PWM signals and the second selection signal, and to output the second PWM signals to one or both of the first pre-driver 251 and the second pre-driver 252 in accordance with information obtained from the second selection signal. When an abnormality occurs in the second microcomputer 222, the fourth inverter selector 214 inputs the first PWM signals and the first selection signal, and outputs the first PWM signals to one or both of the first pre-driver 251 and the second pre-driver 252 in accordance with information obtained from the first selection signal.

In the first microcomputer 221, the first output port 2213 is configured to output the first selection signal to the first inverter selector 211 and the third inverter selector 213. The second output port 2214 is configured to output the first PWM signals to the third inverter selector 213 and the fourth inverter selector 214.

In the second microcomputer 222, the first output port 2223 is configured to output the second selection signal to the second inverter selector 212 and the fourth inverter selector 214. The second output port 2224 is configured to output the second PWM signals to the third inverter selector 213 and the fourth inverter selector 214.

In the motor control device 112 according to the twelfth embodiment, the third inverter selector 213 is provided between the first microcomputer 221 and the first pre-driver 251, and the fourth inverter selector 214 is provided between the second microcomputer 222 and the second pre-driver 252. With this configuration, even in a case where the pre-drivers are two pre-drivers of the first pre-driver 251 and the second pre-driver 252, when one of the first inverter selector 211 and the second inverter selector 212 fails, and the control of another inverter selector is to be continued, the first microcomputer 221 and the second microcomputer 222 use the PWM signals different from each other, to thereby be able to continue the control of the multi-inverter unit 20.

Thirteenth Embodiment

A basic configuration of a thirteenth embodiment of the present invention is the same as that of the twelfth embodiment. Therefore, description is only given of a difference from the twelfth embodiment.

Figure 17:
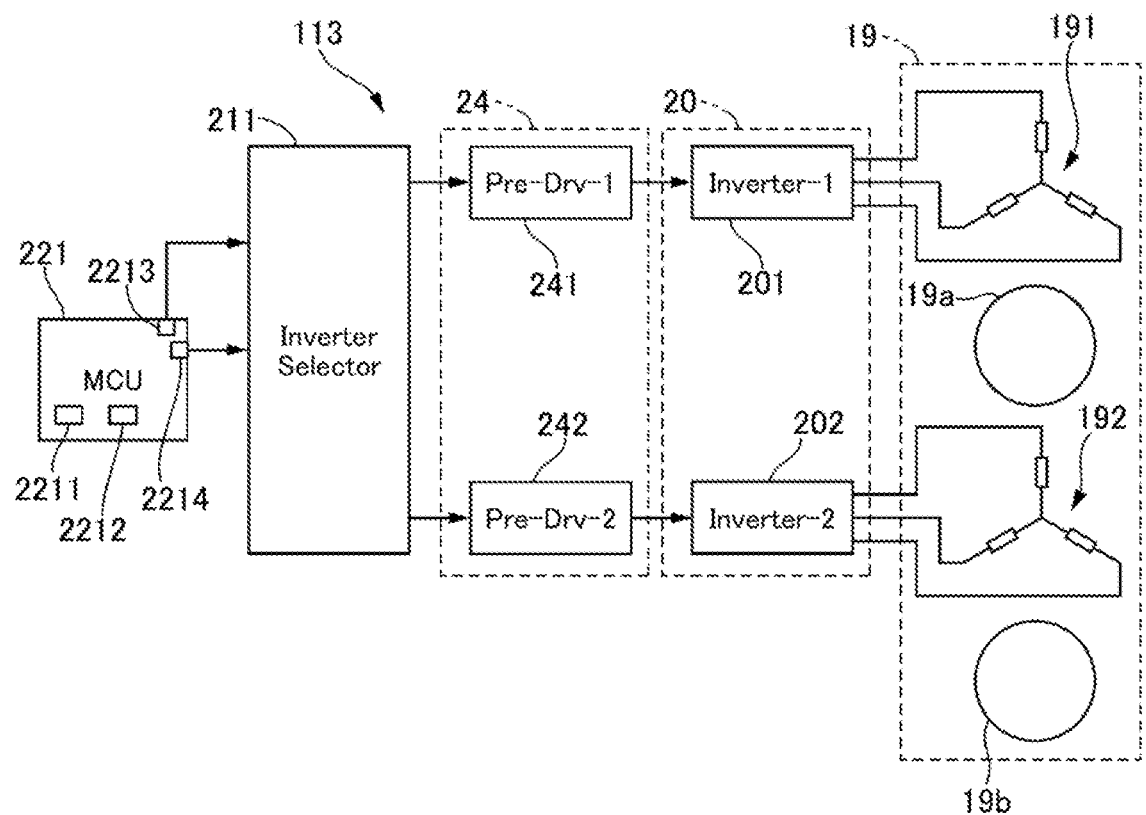
FIG. 17 is a configuration diagram of a motor control device 113 according to a thirteenth embodiment of the present invention.

FIG. 17 is a configuration diagram of a motor control device 113 according to the thirteenth embodiment.

The brushless motor unit 19 includes the second motor rotor 19*b* and the second stator coil 192. The second motor rotor 19*b* has the same structure as that of the first motor rotor 19*a*. The second stator coil 192 has the same structure as that of the first stator coil 191. The second stator coil 192 is configured to rotationally drive the second motor rotor 19*b* in accordance with the voltages applied in the respective phases (U, V, and W phases) based on the PWM control law. The second motor rotor 19*b* and the second stator coil 192 are accommodated in the housing different from that for the first motor rotor 19*a* and the first stator coil 191. That is, the motor control device 113 according to the thirteenth embodiment includes the two brushless motors as the electric motor 3. The first stator coil 191 and the second stator coil 192 may be accommodated in the same housing, and may be configured to rotationally drive the common motor rotor (first motor rotor 19*a*).

In the motor control device 113 according to the thirteenth embodiment, the stator coils of the brushless motor unit 19 have the redundant configuration formed of the first stator coil 191 and the second stator coil 192. Therefore, the rotational driving of the electric motor 3 can be continued by one stator coil when another stator coil fails.

Fourteenth Embodiment

A basic configuration of a fourteenth embodiment of the present invention is the same as that of the thirteenth embodiment. Therefore, description is only given of a difference from the thirteenth embodiment.

Figure 18:
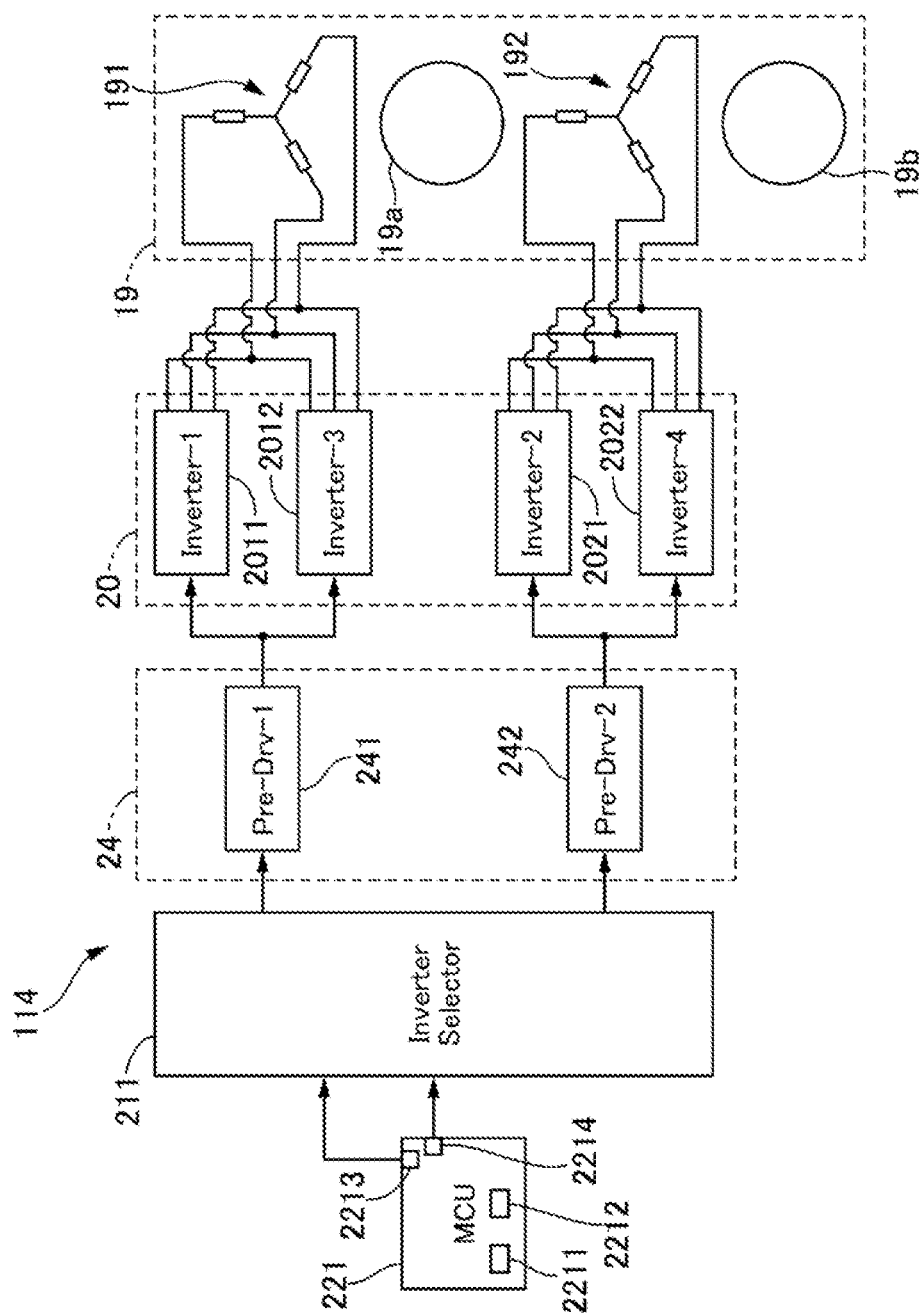
FIG. 18 is a configuration diagram of a motor control device 114 according to a fourteenth embodiment of the present invention.

FIG. 18 is a configuration diagram of a motor control device 114 according to the fourteenth embodiment.

The multi-inverter unit 20 includes the two first inverter units 2011 and 2012 and two second inverter units 2021 and 2022. The 1st first inverter unit 2011 and the 2nd first inverter unit (third inverter unit) 2012 are configured to be able to output the three-phase AC voltages to the first stator coil 191 based on the first PWM signals. The 1st second inverter unit 2021 and the 2nd second inverter unit (fourth inverter unit) 2022 are configured to be able to output the three-phase AC voltages to the second stator coil 192 based on the second PWM signals.

The first pre-driver 241 is configured to be able to output the first PWM signals to the two first inverter units 2011 and 2012.

The second pre-driver 242 is configured to be able to output the second PWM signals to the two second inverter units 2021 and 2022.

In the motor control device 114 according to the fourteenth embodiment, the multi-inverter unit 20 includes the two first inverter units 2011 and 2012 and the two second inverter units 2021 and 2022. With this configuration, pieces of motor control different in phase, for example, can be achieved between the first stator coil 191 and the second stator coil 192.

Fifteenth Embodiment

A basic configuration of a fifteenth embodiment of the present invention is the same as that of the fourteenth embodiment. Therefore, description is only given of a difference from the fourteenth embodiment.

Figure 19:
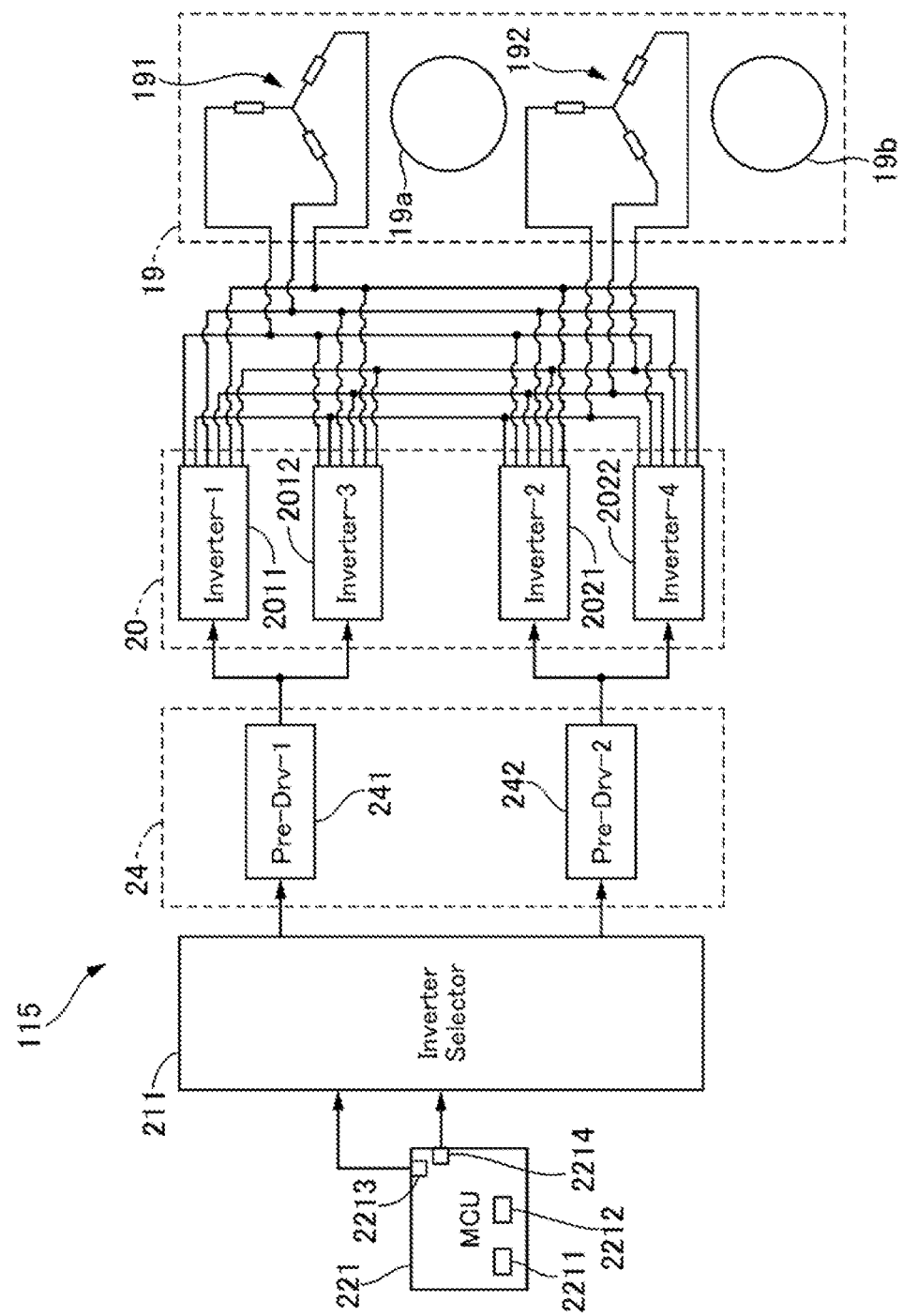
FIG. 19 is a configuration diagram of a motor control device 115 according to a fifteenth embodiment of the present invention.

FIG. 19 is a configuration diagram of a motor control device 115 according to the fifteenth embodiment.

The 1st first inverter unit 2011 and the 2nd first inverter unit 2012 are configured to be able to output the three-phase AC voltages to the first stator coil 191 and the second stator coil 192 based on the first PWM signals.

The 1st second inverter unit 2021 and the 2nd second inverter unit 2022 are configured to be able to output the three-phase AC voltages to the first stator coil 191 and the second stator coil 192 based on the second PWM signals.

In the motor control device 115 according to the fifteenth embodiment, the inverter units 2011, 2012, 2021 and 2022 are configured to be able to output the three-phase AC voltages to the first stator coil 191 and the second stator coil 192. With this configuration, even when one of the first pre-driver 241 and the second pre-driver 242 fails, the other one can be used to output the three-phase AC voltages to both of the stator coils 191 and 192. As a result, it is possible to achieve, for example, the continuation of the power steering control, and the safety of the electric power steering device 1 can thus be increased.

Sixteenth Embodiment

A basic configuration of a sixteenth embodiment of the present invention is the same as that of the eighth embodiment. Therefore, description is only given of a difference from the eighth embodiment.

Figure 20:
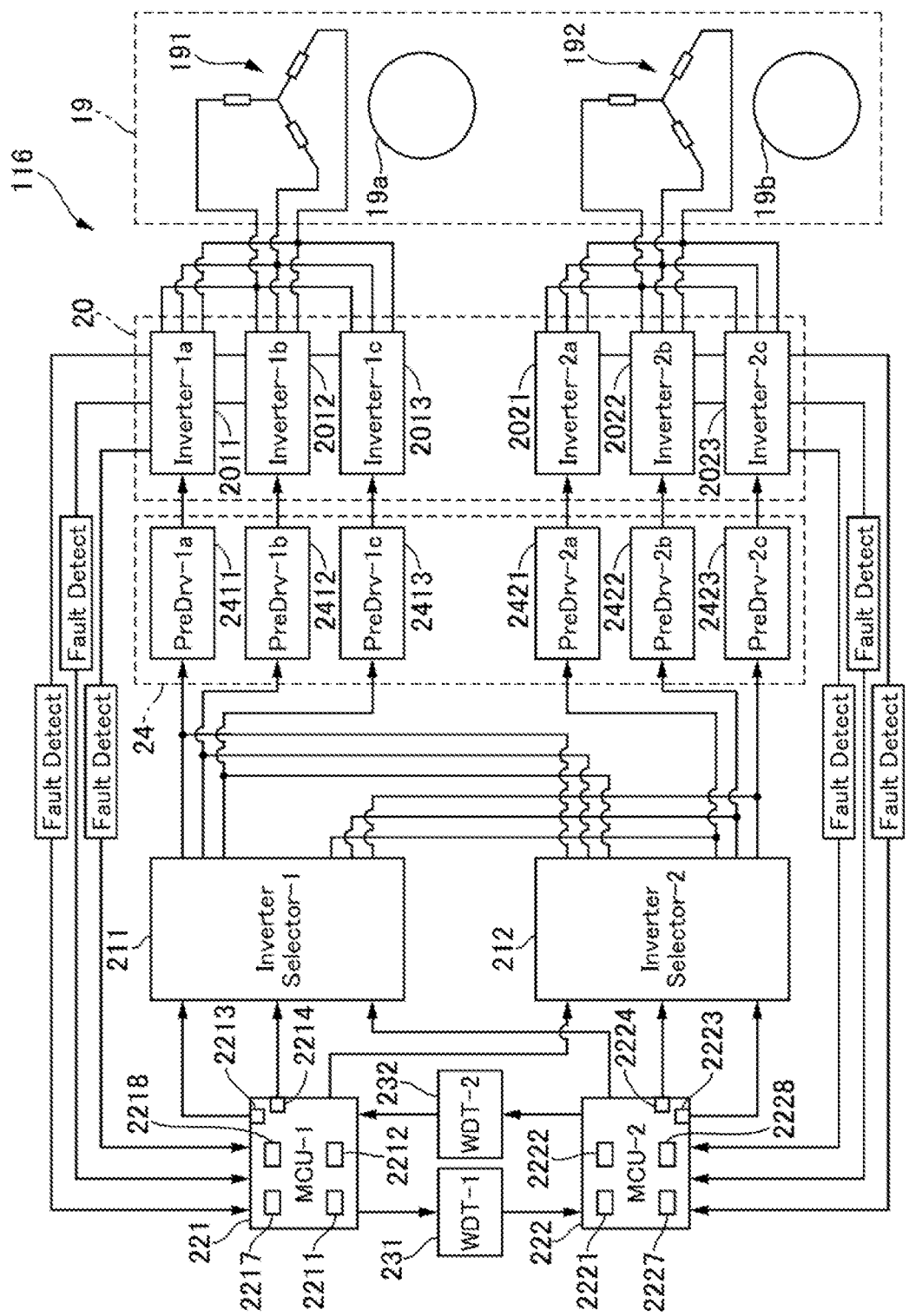
FIG. 20 is a configuration diagram of a motor control device 116 according to a sixteenth embodiment of the present invention.

FIG. 20 is a configuration diagram of a motor control device 116 according to the sixteenth embodiment.

The multi-inverter unit 20 includes the three first inverter units 2011, 2012, and 2013 and the three second inverter units 2021, 2022, and 2023. The 1st first inverter unit 2011, the 2nd first inverter unit 2012, and the third first inverter unit 2013 are configured to be able to output the three-phase AC voltages to the first stator coil 191 based on the first PWM signals. The 1st second inverter unit 2021, the 2nd second inverter unit 2022, and the third second inverter unit 2023 are configured to be able to output the three-phase AC voltages to the second stator coil 192 based on the second PWM signals.

The pre-driver unit 24 includes three first pre-drivers 2411, 2412, and 2413 and three second pre-drivers 2421, 2422, and 2423. The 1st first pre-driver 2411 is configured to amplify the first PWM signals, to thereby output the amplified first PWM signals to the 1st first inverter unit 2011. The 2nd first pre-driver 2412 is configured to amplify the first PWM signals, to thereby output the amplified first PWM signals to the 2nd first inverter unit 2012. The third first pre-driver 2413 is configured to amplify the first PWM signals, to thereby output the amplified first PWM signals to the third first inverter unit 2013. The 1st second pre-driver 2421 is configured to amplify the second PWM signals, to thereby output the amplified second PWM signals to the 1st second inverter unit 2021. The 2nd second pre-driver 2422 is configured to amplify the second PWM signals, to thereby output the amplified second PWM signals to the 2nd second inverter unit 2022. The third second pre-driver 2423 is configured to amplify the second PWM signals, to thereby output the amplified second PWM signals to the third second inverter unit 2023.

The first inverter selector 211 is configured to input the first PWM signals and the first selection signal, and to output the first PWM signals to the first inverter units 2011, 2012, and 2013 and the second inverter units 2021, 2022, and 2023 in accordance with information obtained from the first selection signal.

The second inverter selector 212 is configured to input the second PWM signals and the second selection signal, and to output the second PWM signals to the first inverter units 2011, 2012, and 2013 and the second inverter units 2021, 2022, and 2023 in accordance with information obtained from the second selection signal.

Figure 21:
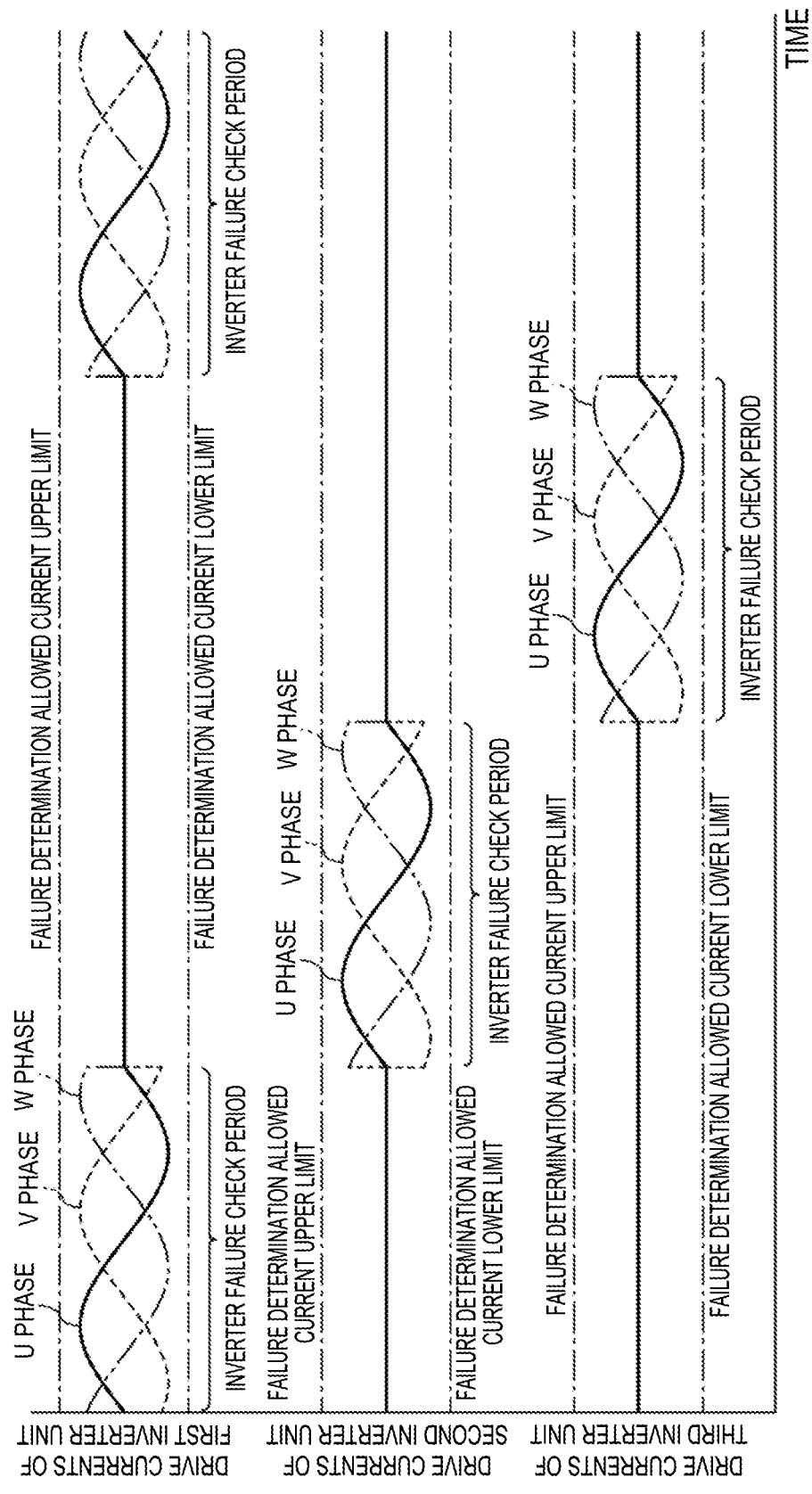
FIG. 21 is a graph for showing drive current waveforms of first inverter units 2011, 2012, and 2013 and second inverter units 2021, 2022, and 2023 in the sixteenth embodiment.

The first microcomputer 221 includes a first multi-inverter-unit abnormality detection unit 2218. As shown in FIG. 21, when absolute values of three-phase AC voltages flowing through the second stator coil 192 are larger than a predetermined value (three-phase AC voltages are larger than a failure determination permission current lower limit and lower than a failure determination permission current upper limit), the first multi-inverter-unit abnormality detection unit 2218 executes current supply check control of detecting abnormality of the 1st first inverter unit 2011 through current supply to the 1st first inverter unit 2011 when the first PWM signals are output to the 1st first inverter unit 2011. The first multi-inverter-unit abnormality detection unit 2218 executes current supply check control of detecting an abnormality of the 2nd first inverter unit 2012 through current supply to the 2nd first inverter unit 2012 when the first PWM signals are output to the 2nd first inverter unit 2012. The first multi-inverter-unit abnormality detection unit 2218 executes current supply check control of detecting an abnormality of the third first inverter unit 2013 through current supply to the third first inverter unit 2013 when the first PWM signals are output to the third first inverter unit 2013. When the absolute values of three-phase AC voltages flowing through the first stator coil 191 are equal to or larger than the predetermined value, the first multi-inverter-unit abnormality detection unit 2218 does not execute the current supply check control.

The second microcomputer 222 includes a second multi-inverter-unit abnormality detection unit 2228. As shown in FIG. 21, when absolute values of three-phase AC voltages flowing through the first stator coil 191 are larger than a predetermined value (three-phase AC voltages are larger than a failure determination permission current lower limit and lower than a failure determination permission current upper limit), the second multi-inverter-unit abnormality detection unit 2228 executes current supply check control of detecting an abnormality of the 1st second inverter unit 2021 through current supply to the 1st second inverter unit 2021 when the second PWM signals are output to the 1st second inverter 2011. The second multi-inverter-unit abnormality detection unit 2228 executes current supply check control of detecting an abnormality of the 2nd second inverter unit 2022 through current supply to the 2nd second inverter unit 2022 when the second PWM signals are output to the 2nd second inverter unit 2022. The second multi-inverter-unit abnormality detection unit 2228 executes current supply check control of detecting an abnormality of the third second inverter unit 2033 through current supply to the third second inverter unit 2033 when the second PWM signals are output to the third second inverter unit 2033. When the absolute values of three-phase AC voltages flowing through the second stator coil 192 are equal to or larger than the predetermined value, the second multi-inverter-unit abnormality detection unit 2228 does not execute the current supply check control.

In the motor control device 116 according to the sixteenth embodiment, the first microcomputer 221 includes the first multi-inverter-unit abnormality detection unit 2218 configured to execute the current supply check control of checking an abnormality of the first inverter units 2011, 2012, and 2013 through the current supply to each of the first inverter units 2011, 2012, and 2013. With this configuration, whether or not an abnormality exists in the multi-inverter unit 20 can be determined, and a location of occurrence of the abnormality can be identified when the abnormality occurs. The same applies to the second multi-inverter-unit abnormality detection unit 2228.

When the first PWM signals are output to any one (for example, the 1st first inverter unit 2011) of the first inverter units, and none of the first PWM signals and the second PWM signals are output to the remaining first inverter units (for example, the first inverter units 2012 and 2013), the first multi-inverter-unit abnormality detection unit 2218 applies the current supply check control to the first inverter unit (for example, the 1st first inverter unit 2011) to which the first PWM signals are output. That is, it is possible to determine whether or not the multi-inverter unit 20 is abnormal even during the motor drive control through the abnormality determination of the driving inverter unit. The same applies to the second multi-inverter-unit abnormality detection unit 2228.

When the absolute values of three-phase AC voltages flowing through the first stator coil 191 are smaller than the predetermined value, the first multi-inverter-unit abnormality detection unit 2218 executes the current supply check control. The first inverter units 2011, 2012, and 2013 cannot output the three-phase AC voltages to the first stator coil 191 during the execution of the current supply check control, and there is a fear in that the output of the brushless motor unit 19 may decrease. Thus, occurrence of insufficient output can be suppressed in the brushless motor unit 19 through the current supply check control executed only when the three-phase AC voltages are smaller than the predetermined value. The same applies to the second multi-inverter-unit failure detection unit 2228.

When the absolute values of three-phase AC voltages flowing through the first stator coil 191 are equal to or larger than the predetermined value, the first multi-inverter-unit abnormality detection unit 2218 does not execute the current supply check control. With this configuration, the occurrence of the insufficient output can be suppressed in the brushless motor unit 19. The same applies to the second multi-inverter-unit failure detection unit 2228.

Seventeenth Embodiment

A basic configuration of a seventeenth embodiment of the present invention is the same as that of the sixteenth embodiment. Therefore, description is only given of a difference from the sixteenth embodiment.

Figure 22:
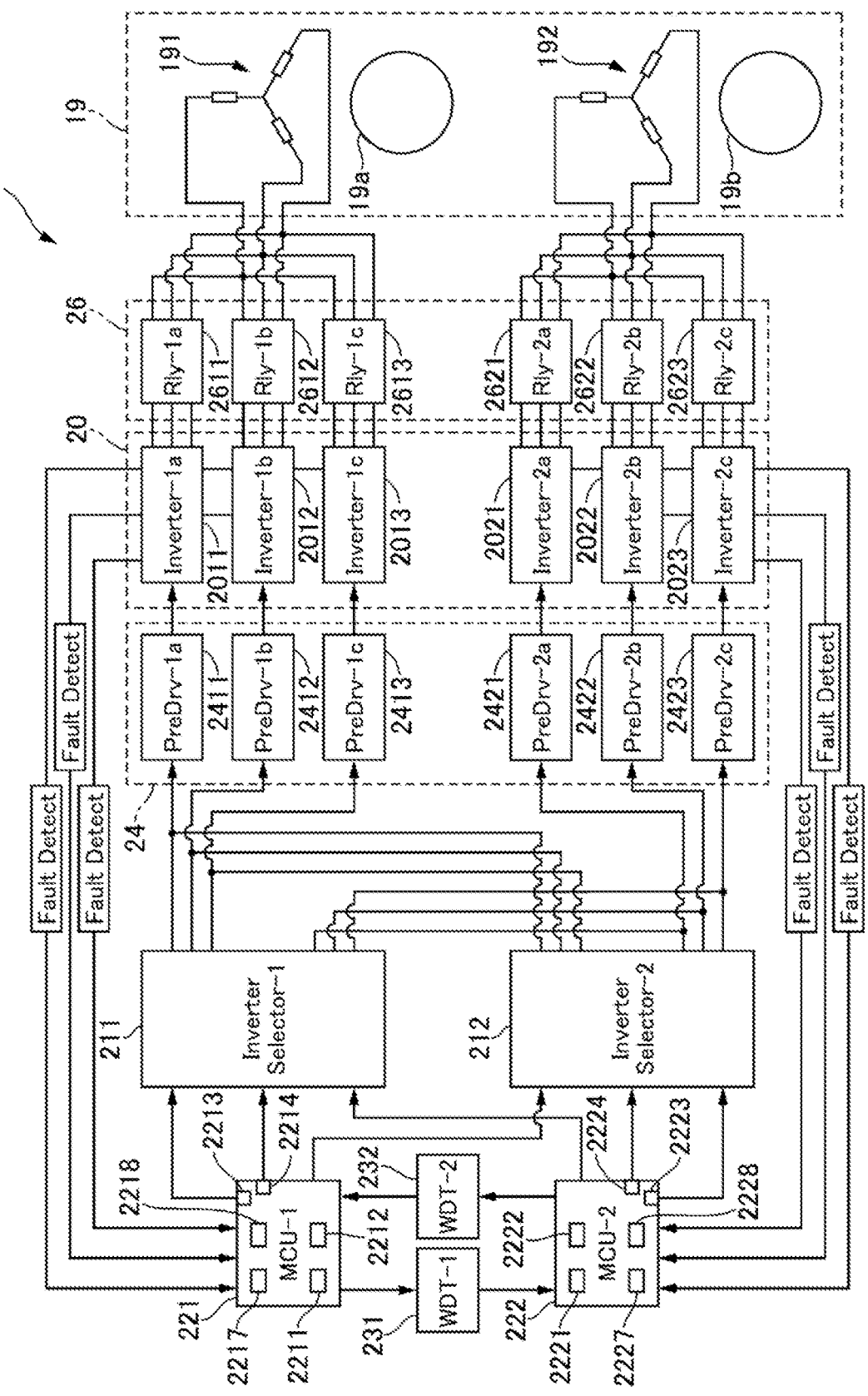
FIG. 22 is a configuration diagram of a motor control device 117 according to a seventeenth embodiment of the present invention.

FIG. 22 is a configuration diagram of a motor control device 117 according to the seventeenth embodiment.

The motor control device 117 includes three first relay units 2611, 2612, and 2613 and three second relay units 2621, 2622, and 2623.

The first relay units 2611, 2612, and 2613 are provided between the first inverter units 2011, 2012, and 2013 and the first stator coil 191. The first relay units 2611, 2612, and 2613 are configured to disconnect current supply circuits between the corresponding first inverter units and the first stator coil 191 when the first multi-inverter-unit abnormality detection unit 2218 detects an abnormality of the first inverter units 2011, 2012, and 2013. With this configuration, for example, when an ON failure occurs in the 1st first inverter unit 2011, the safety of the electric power steering device 1 can be increased by turning off the 1st first relay unit 2611 to disconnect the current supply circuit between the 1st first inverter unit 2011 and the first stator coil 191.

The second relay units 2621, 2622, and 2623 are provided between the second inverter units 2021, 2022, and 2023 and the second stator coil 192. The second relays 2621, 2622, and 2623 are configured to disconnect current supply circuits between the corresponding second inverter units and the second stator coil 192 when the second multi-inverter-unit abnormality detection unit 2228 detects an abnormality of the second inverter units 2021, 2022, and 2023. With this configuration, for example, when an ON failure occurs in the 1st second inverter unit 2021, the safety of the electric power steering device 1 can be increased by turning off the 1st second relay unit 2621 to disconnect the current supply circuit between the 1st second inverter unit 2021 and the second stator coil 192.

Eighteenth Embodiment

A basic configuration of an eighteenth embodiment of the present invention is the same as that of the tenth embodiment. Therefore, description is only given of a difference from the tenth embodiment.

Figure 23:
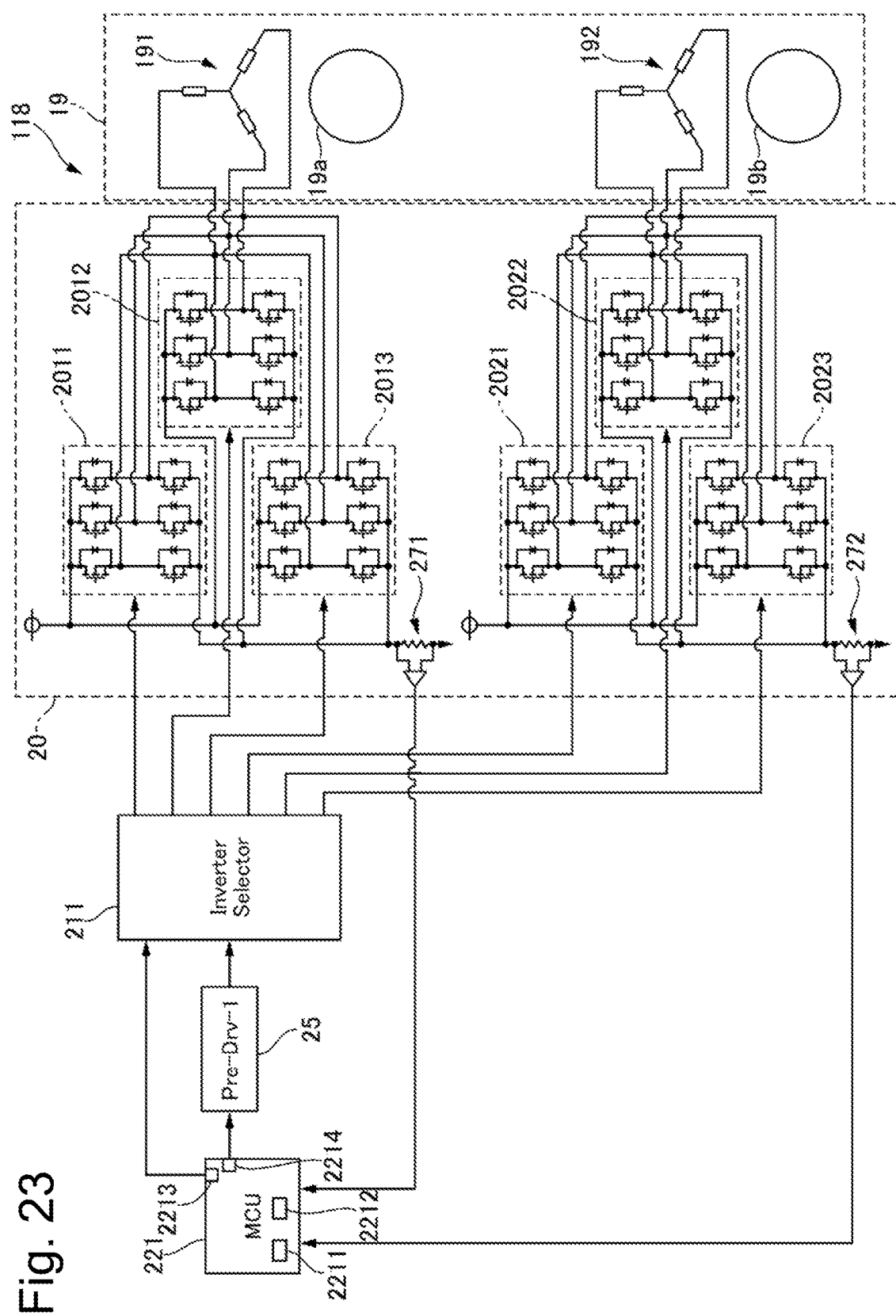
FIG. 23 is a configuration diagram of a motor control device 118 according to an eighteenth embodiment of the present invention.

FIG. 23 is a configuration diagram of a motor control device 118 according to the eighteenth embodiment.

The multi-inverter unit 20 includes the three first inverter units 2011, 2012, and 2013 and the three second inverter units 2021, 2022, and 2023. The first inverter units 2011, 2012, and 2013 are configured to be able to output the three-phase voltages to the first stator coil 191 based on the first PWM signals. The second inverter units 2021, 2022, and 2023 are configured to be able to output the three-phase voltages to the second stator coil 192 based on the first PWM signals.

The motor control device 118 includes a first current sensor 271 and a second current sensor 272.

The first current sensor 271 is configured to detect a three-phase current value (phase current value) flowing through the first stator coil 191, to thereby output a signal corresponding to the current value.

The second current sensor 272 is configured to detect a three-phase current value (phase current value) flowing through the second stator coil 192, to thereby output a signal corresponding to the current value.

The first inverter selector 211 is configured to input the first PWM signals and the first selection signal, and to output the first PWM signals to one or both of the first inverter units 2011, 2012, and 2013 and the second inverter units 2021, 2022, and 2023 in accordance with information obtained from the first selection signal.

When the first PWM signals are to be generated, the first PWM signal generation unit 2212 corrects the first PWM signals through feedback based on the three-phase current value detected by the first current sensor 271 or the three-phase current value detected by the second current sensor 272. With this configuration, precision of the motor control can be increased.

Nineteenth Embodiment

A basic configuration of a nineteenth embodiment of the present invention is the same as that of the eighteenth embodiment. Therefore, description is only given of a difference from the eighteenth embodiment.

Figure 24:
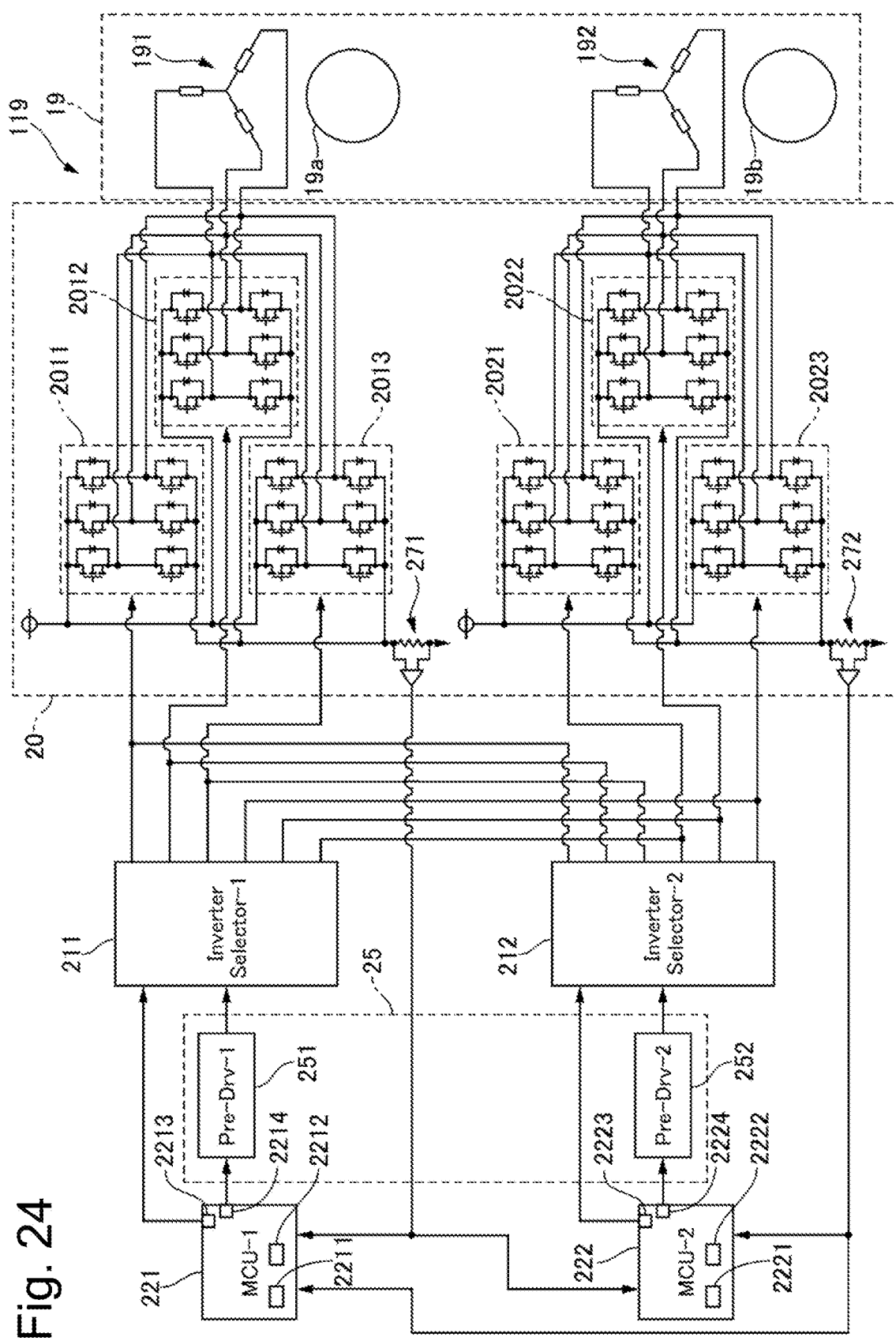
FIG. 24 is a configuration diagram of a motor control device 119 according to a nineteenth embodiment of the present invention.

FIG. 24 is a configuration diagram of a motor control device 119 according to the nineteenth embodiment.

The second inverter selector 212 is configured to input the second PWM signals and the second selection signal, and to output the second PWM signals to one or another of the first inverter units 2011, 2012, and 2013 and the second inverter units 2021, 2022, and 2023 in accordance with information obtained from the second selection signal.

The second pre-driver 252 is configured to amplify the second PWM signals, to thereby output the amplified second PWM signals to the second inverter selector 212.

When the second PWM signals are to be generated, the second PWM signal generation unit 2222 of the second microcomputer 222 corrects the second PWM signals through feedback based on the three-phase current value detected by the first current sensor 271 or the three-phase current value detected by the second current sensor 272. With this configuration, precision of the motor control can be increased.

In the motor control device 119 according to the nineteenth embodiment, each of the first microcomputer 221 and the second microcomputer 222 can independently control the first stator coil 191 and the second stator coil 192.

OTHER EMBODIMENTS

The embodiments of the present invention has been described above. However, the specific configurations of the present invention are not limited to the configurations described in the embodiments. A modification in design without departing from the scope of the gist of the invention is also encompassed in the present invention.

For example, when the multi-inverter unit includes a third inverter unit configured to be able to output the first motor drive signals to the first stator coil in addition to the first inverter unit and the second inverter unit, according to the present invention, it is possible to generate a state in which the first motor command signals are output to all of the inverter units and a state in which, when the third inverter unit fails, the first motor command signals are output to the first and second inverter units but the first motor command signals are not output to the third inverter unit. An amount of the decrease in output of the first brushless motor in this case is an amount of the decrease in output of the third inverter unit, and the decrease in output of the first brushless motor can thus be suppressed.

In the fifth embodiment, when one inverter unit fails, the first motor command signals output to respective remaining inverter units are not required to be the same.

Description is now given of technical ideas that may be understood from the embodiments described above.

In one aspect, a motor control device is configured to control drive of a brushless motor unit. The brushless motor unit includes a motor rotor and a first stator coil. The motor control device includes a multi-inverter unit, and the multi-inverter unit includes a first inverter unit and a second inverter unit. The first inverter unit is configured to output first motor drive signals to the first stator coil based on first motor command signals input to the first inverter unit. The second inverter unit is configured to output the first motor drive signals to the first stator coil based on the first motor command signals input to the second inverter unit. The motor control device further includes a first inverter switching control unit, and the first inverter switching control unit is configured to selectively output the first motor command signals to the first inverter unit and the second inverter unit. The motor control device further includes a first microcomputer, and the first microcomputer includes a first inverter switching control signal generation unit and a first motor command signal generation unit. The first inverter switching control signal generation unit is configured to generate a first inverter switching control signal to be output to the first inverter switching control unit. The first inverter switching control signal is a signal containing information on, in the first inverter switching control unit, whether the first motor command signals are to be output to the first inverter unit and whether the first motor command signals are to be output to the second inverter unit. The first motor command signal generation unit is configured to generate the first motor command signals serving as command signals, which are transmitted to the first stator coil to control the drive of the brushless motor unit.

In a more preferred aspect, in the aspect described above, the motor control device further includes a second microcomputer. The brushless motor unit includes a second stator coil. The second microcomputer includes a second motor command signal generation unit. The second motor command signal generation unit is configured to generate second motor command signals serving as command signals, which are transmitted to the second stator coil to control the drive of the brushless motor unit.

In another preferred aspect, in any one of the aspects described above, the second inverter switching control unit is configured to selectively output the second motor command signals to the first inverter unit and the second inverter unit. The second microcomputer includes a second inverter switching control signal generation unit. The second inverter switching control signal generation unit is configured to generate a second inverter switching control signal to be output to the second inverter switching control unit. The second inverter switching control signal is a signal containing information on, in the second inverter switching control unit, whether the second motor command signals are to be output to the first inverter unit and whether the second motor command signals are to be output to the second inverter unit.

In still another preferred aspect, in any one of the aspects described above, the multi-inverter unit includes a plurality of first inverter units and a plurality of second inverter units. The first inverter switching control unit is configured to selectively output the first motor command signals to all of the plurality of first inverter units and the plurality of second inverter units of the multi-inverter unit. The second inverter switching control unit is configured to selectively output the second motor command signals to all of the plurality of first inverter units and the plurality of second inverter units of the multi-inverter unit.

In still another preferred aspect, in any one of the aspects described above, the first microcomputer is configured to output the first inverter switching control signal to the second inverter switching control unit, and the second microcomputer is configured to output the second inverter switching control signal to the first inverter switching control unit.

In still another preferred aspect, in any one of the aspects described above, the first stator coil and the second stator coil are provided outside the motor rotor in a radial direction of the motor rotor with respect to a rotation axis of the motor rotor, and are configured to rotationally drive the motor rotor through use of magnetic fields formed by the first stator coil and the second stator coil, and the second microcomputer is configured to output the second motor command signals at a timing shifted from a timing at which the first microcomputer outputs the first motor command signals.

In still another preferred aspect, in any one of the aspects described above, the first microcomputer includes a 1st first-microcomputer output port and a 2nd first-microcomputer output port. The 1st first-microcomputer output port is configured to output the first inverter switching control signal to the first inverter switching control unit. The 2nd first-microcomputer output port is configured to output the first inverter switching control signal to the second inverter switching control unit. The second microcomputer includes a 1st second-microcomputer output port and a 2nd second-microcomputer output port. The 1st second-microcomputer output port is configured to output the second inverter switching control signal to the first inverter switching control unit. The 2nd second-microcomputer output port is configured to output the second inverter switching control signal to the second inverter switching control unit.

In still another preferred aspect, in any one of the aspects described above, the first microcomputer includes a first watchdog timer signal output unit. The first watchdog timer signal is output to the second microcomputer so that the second microcomputer determines whether an abnormality of the first microcomputer exists. The second microcomputer includes a second watchdog timer signal output unit. The second watchdog timer signal is output to the first microcomputer so that the first microcomputer determines whether an abnormality of the second microcomputer exists.

In still another preferred aspect, in any one of the aspects described above, the pre-driver unit is provided between the first microcomputer and the first inverter switching control unit or between the first inverter switching control unit and the multi-inverter unit, and is a driver configured to control drive of the multi-inverter unit based on the first motor command signals.

In still another preferred aspect, in any one of the aspects described above, the pre-driver unit is provided between the first microcomputer and the first inverter switching control unit.

In still another preferred aspect, in any one of the aspects described above, the motor control device includes a second microcomputer and a second inverter switching control unit. The brushless motor unit includes a second stator coil. The second microcomputer includes a second motor command signal generation unit and a second inverter switching control unit. The second motor command signal generation unit is configured to generate second motor command signals serving as command signals, which are transmitted to the second stator coil to control the drive of the brushless motor unit. The second inverter switching control signal generation unit is configured to generate a second inverter switching control signal to be output to the second inverter switching control unit. The second inverter switching control signal is a signal containing information on, in the second inverter switching control unit, whether the second motor command signals are to be output to the first inverter unit and whether the second motor command signals are to be output to the second inverter unit. The second inverter switching control unit is configured to selectively output the second motor command signals to the first inverter unit and the second inverter unit. The pre-driver unit includes a first pre-driver and a second pre-driver. The first pre-driver is configured to output the first motor command signals to the first inverter switching control unit and the second inverter switching control unit. The second pre-driver is configured to output the second motor command signals to the first inverter switching control unit and the second inverter switching control unit.

In still another preferred aspect, in any one of the aspects described above, the motor control device further includes a third inverter switching control unit and a fourth inverter switching control unit. The third inverter switching control unit is configured to receive the first inverter switching control signal from the first microcomputer, to thereby output the first inverter switching control signal to the first pre-driver and the second pre-driver. The third inverter switching control unit is configured to receive the second inverter switching control signal from the second microcomputer, to thereby output the second inverter switching control signal to the first pre-driver and the second pre-driver. The fourth inverter switching control unit is configured to receive the first inverter switching control signal from the first microcomputer, to thereby output the first inverter switching control signal to the first pre-driver and the second pre-driver. The fourth inverter switching control unit is configured to receive the second inverter switching control signal from the second microcomputer, to thereby output the second inverter switching control signal to the first pre-driver and the second pre-driver.

In still another preferred aspect, in any one of the aspects described above, the pre-driver unit is provided between the first inverter switching control unit and the multi-inverter unit, and includes a first pre-driver and a second pre-driver. The first pre-driver is configured to control drive of the first inverter unit based on the first motor command signals. The second pre-driver is configured to control drive of the second inverter unit based on the first motor command signals.

In still another preferred aspect, in any one of the aspects described above, the brushless motor unit includes a second stator coil and the first motor command signal generation unit is configured to transmit the first motor command signals to the second stator coil.

In still another preferred aspect, in any one of the aspects described above, the multi-inverter unit includes a third inverter unit and a fourth inverter unit. The third inverter unit is configured to output the first motor drive signals to the first stator coil based on the first motor command signals input to the third inverter unit. The fourth inverter unit is configured to output the second motor drive signals to the second stator coil based on the first motor command signals input to the fourth inverter unit.

In still another preferred aspect, in any one of the aspects described above, the first inverter unit and the third inverter unit are configured to output the first motor command signals to the second stator coil, and the second inverter unit and the fourth inverter unit are configured to output the first motor command signals to the first stator coil.

In still another preferred aspect, in any one of the aspects described above, when an abnormality occurs in the first inverter unit, the first inverter switching control signal generation unit outputs the first inverter switching control signal to the inverter switching control unit so that the first motor command signals are inhibited from being output from the first inverter switching control unit to the first inverter unit.

In still another preferred aspect, in any one of the aspects described above, when the abnormality occurs in the first inverter unit, the first motor command signal generation unit changes the first motor command signals to be output to the second inverter unit from the first motor command signals used when the abnormality does not occur in the first inverter unit.

In still another preferred aspect, in any one of the aspects described above, when the abnormality occurs in the first inverter unit, the first motor command signal generation unit increases the first motor command signals to be output to the second inverter unit compared with the first motor command signals used when the abnormality does not occur in the first inverter unit.

In still another preferred aspect, in any one of the aspects described above, the multi-inverter unit includes a plurality of first inverter units and a plurality of second inverter units, and when an abnormality occurs in a 1st first inverter unit of the first inverter units, the first motor command signal generation unit increases the first motor command signals to be output to all inverter units of the multi-inverter unit other than the 1st first inverter unit compared with the first motor command signals used when the abnormality does not occur in the plurality of first inverter units.

In still another preferred aspect, in any one of the aspects described above, when an abnormality occurs in the 1st first inverter unit of the first inverter units, the first motor command signal generation unit uniformly increases the first motor command signals to be output to all inverter units of the multi-inverter unit other than the 1st first inverter unit compared with the first motor command signals used when the abnormality does not occur in the plurality of first inverter units.

In still another preferred aspect, in any one of the aspects described above, the first microcomputer includes a multi-inverter-unit abnormality detection unit, and the multi-inverter-unit abnormality detection unit is configured to execute current supply check control of detecting an abnormality of the multi-inverter unit through current supply to each of the first inverter unit and the second inverter unit.

In still another preferred aspect, in any one of the aspects described above, when the first motor command signals are output to the first inverter unit of the first inverter unit and the second inverter unit, and the first motor command signals are not output to the second inverter unit, the multi-inverter-unit abnormality detection unit executes the current supply check control for the second inverter unit.

In still another preferred aspect, in any one of the aspects described above, when a value of each of the first motor command signals is less than a predetermined value, the multi-inverter-unit abnormality detection unit executes the current supply check control.

In still another preferred aspect, in any one of the aspects described above, when the value of each of the first motor command signals is equal to or larger than the predetermined value, the multi-inverter-unit abnormality detection unit avoids executing the current supply check control.

In still another preferred aspect, in any one of the aspects described above, the motor control device further includes a relay. The relay is provided between the multi-inverter unit and the brushless motor unit. When the multi-inverter abnormality detection unit detects an abnormality of the first inverter unit, the relay disconnects a current supply circuit between the first inverter unit and the brushless motor unit.

In still another preferred aspect, in any one of the aspects described above, when an abnormality occurs in the first inverter unit, the first motor command signal generation unit increases the first motor command signals to be output to the second inverter unit compared with the first motor command signals used when the abnormality does not occur in the first inverter unit.

In still another preferred aspect, in any one of the aspects described above, the motor control device further includes a first current sensor and a second current sensor. The brushless motor unit includes a second stator coil. The first motor command signal generation unit is configured to transmit the first motor command signals to the second stator coil. The first current sensor is configured to detect a value of a current flowing through the first stator coil. The second current sensor is configured to detect a value of a current flowing through the second stator coil. The first motor command signal generation unit is configured to generate the first motor command signals based on an output signal of the first current sensor or an output signal of the second current sensor.

In still another preferred aspect, in any one of the aspects described above, the motor control device further includes a second microcomputer. The second microcomputer includes a second motor command signal generation unit. The first motor command signal generation unit is configured to generate the first motor command signals based on the output signal of the first current sensor. The second motor command signal generation unit is configured to generate the second motor command signals based on the output signal of the second current sensor.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2018-049738 filed on Mar. 16, 2018. All disclosed contents including Specification, Scope of Claims, Drawings, and Abstract of Japanese Patent Application No. 2018-049738 filed on Mar. 16, 2018 are incorporated herein by reference in their entirety.

REFERENCE SIGNS LIST 1 electric power steering device, 101 motor control device, 19 brushless motor unit, 19*a* motor rotor (first motor rotor), 191 first stator coil, 20 multi-inverter unit, 201 first inverter unit, 202 second inverter unit, 211 first inverter selector (first inverter switching control unit), 221 first microcomputer, 2211 first selection signal generation unit (first inverter switching control signal generation unit), 2212 first PWM signal generation unit (first motor command signal generation unit)

The invention claimed is:
1. A motor control device,
the motor control device being configured to control driving of a brushless motor unit, the brushless motor unit including a motor rotor, a first stator coil and a second stator coil, the motor control device comprising a multi-inverter unit,
wherein the multi-inverter unit includes a plurality of first inverter units and a plurality of second inverter units,
wherein one of the plurality of first inverter units is configured to output first motor drive signals to the first stator coil based on first motor command signals input to the one of the plurality of first inverter units, and
wherein one of the plurality of second inverter units is configured to output the first motor drive signals to the first stator coil based on the first motor command signals input to the one of the plurality of second inverter units,
wherein the motor control device further comprises a first inverter switching controller and a second inverter switching controller,
wherein the first inverter switching controller is configured to selectively output the first motor command signals to the one of the plurality of first inverter units and the one of the plurality of second inverter units,
wherein the motor control device further comprises a first microcomputer and a second microcomputer,
wherein the first microcomputer includes a first inverter switching control signal generator and a first motor command signal generator,
wherein the second microcomputer includes a second inverter switching control signal generator and a second motor command signal generator,
wherein the first inverter switching control signal generator is configured to generate a first inverter switching control signal to be output to the first inverter switching controller,
wherein the second inverter switching control signal generator is configured to generate a second inverter switching control signal to be output to the second inverter switching controller,
wherein the first motor command signal generator is configured to generate the first motor command signals serving as command signals, which are transmitted to the first stator coil to control the driving of the brushless motor unit, wherein the second motor command signal generator is configured to generate second motor command signals serving as command signals, which are transmitted to the second stator coil to control the driving of the brushless motor unit, wherein the first inverter switching control signal is a signal containing information about, in the first inverter switching controller, whether the first motor command signals are to be output to the one of the plurality of first inverter units and whether the first motor command signals are to be output to the one of the plurality of second inverter units, wherein the second inverter switching control signal is a signal containing information about, in the second inverter switching controller, whether the second motor command signals are to be output to the one of the plurality of first inverter units and whether the second motor command signals are to be output to the one of the plurality of second inverter units, wherein the second inverter switching controller is configured to selectively output the second motor command signals to the one of the plurality of first inverter units and the one of the plurality of second inverter units, wherein the first inverter switching controller is configured to selectively output the first motor command signals to all of the plurality of first inverter units and the plurality of second inverter units of the multi-inverter unit, wherein the second inverter switching controller is configured to selectively output the second motor command signals to all of the plurality of first inverter units and the plurality of second inverter units of the multi-inverter unit, wherein the first microcomputer is configured to output the first inverter switching control signal to the second inverter switching controller, and wherein the second microcomputer is configured to output the second inverter switching control signal to the first inverter switching controller.

2. The motor control device according to claim 1, wherein the first stator coil and the second stator coil are provided outside the motor rotor in a radial direction of the motor rotor with respect to a rotation axis of the motor rotor, and are configured to rotationally drive the motor rotor through use of magnetic fields formed by the first stator coil and the second stator coil, and wherein the second microcomputer is configured to output the second motor command signals at a timing shifted from a timing at which the first microcomputer outputs the first motor command signals.

3. The motor control device according to claim 1, wherein the first microcomputer includes a 1st first-microcomputer output port and a 2nd first-microcomputer output port, wherein the 1st first-microcomputer output port is configured to output the first inverter switching control signal to the first inverter switching controller, wherein the 2nd first-microcomputer output port is configured to output the first inverter switching control signal to the second inverter switching controller, wherein the second microcomputer includes a first second-microcomputer output port and a 2nd second-microcomputer output port, wherein the first second-microcomputer output port is configured to output the second inverter switching control signal to the first inverter switching controller, and wherein the 2nd second-microcomputer output port is configured to output the second inverter switching control signal to the second inverter switching controller.

4. The motor control device according to claim 1, further comprising a pre-driver unit, wherein the pre-driver unit is provided between the first microcomputer and the first inverter switching controller or between the first inverter switching controller and the multi-inverter unit, and is a driver configured to control driving of the multi-inverter unit based on the first motor command signals.

5. The motor control device according to claim 4, wherein the pre-driver unit is provided between the first microcomputer and the first inverter switching controller.

6. The motor control device according to claim 5, wherein the pre-driver unit includes a first pre-driver and a second pre-driver, wherein the first pre-driver is configured to output the first motor command signals to the first inverter switching controller and the second inverter switching controller, and wherein the second pre-driver is configured to output the second motor command signals to the first inverter switching controller and the second inverter switching controller.

7. The motor control device according to claim 6, further comprising a third inverter switching controller and a fourth inverter switching controller, wherein the third inverter switching controller is configured to receive the first inverter switching control signal from the first microcomputer, to thereby output the first inverter switching control signal to the first pre-driver and the second pre-driver, wherein the third inverter switching controller is configured to receive the second inverter switching control signal from the second microcomputer, to thereby output the second inverter switching control signal to the first pre-driver and the second pre-driver, wherein the fourth inverter switching controller is configured to receive the first inverter switching control signal from the first microcomputer, to thereby output the first inverter switching control signal to the first pre-driver and the second pre-driver, and wherein the fourth inverter switching controller is configured to receive the second inverter switching control signal from the second microcomputer, to thereby output the second inverter switching control signal to the first pre-driver and the second pre-driver.

8. The motor control device according to claim 4, wherein the pre-driver unit is provided between the first inverter switching controller and the multi-inverter unit, and includes a first pre-driver and a second pre-driver, wherein the first pre-driver is configured to control driving of the one of the plurality of first inverter units based on the first motor command signals, and wherein the second pre-driver is configured to control driving of the one of the plurality of second inverter units based on the first motor command signals.

9. The motor control device according to claim 4,
wherein the first motor command signal generator is configured to transmit the first motor command signals to the second stator coil.

10. The motor control device according to claim 9,
wherein the multi-inverter unit includes a third inverter unit and a fourth inverter unit,
wherein the third inverter unit is configured to output the first motor drive signals to the first stator coil based on the first motor command signals input to the third inverter unit, and
wherein the fourth inverter unit is configured to output the second motor drive signals to the second stator coil based on the first motor command signals input to the fourth inverter unit.

11. The motor control device according to claim 10,
wherein the one of the plurality of first inverter units and the third inverter unit are configured to output the first motor command signals to the second stator coil, and
wherein the one of the plurality of second inverter units and the fourth inverter unit are configured to output the first motor command signals to the first stator coil.

12. The motor control device according to claim 1, wherein, when an abnormality occurs in the one of the plurality of first inverter units, the first inverter switching control signal generator outputs the first inverter switching control signal to the inverter switching controller so that the first motor command signals are inhibited from being output from the first inverter switching controller to the one of the plurality of first inverter units.

13. The motor control device according to claim 12, wherein, when the abnormality occurs in the one of the plurality of first inverter units, the first motor command signal generator changes the first motor command signals to be output to the one of the plurality of second inverter units from the first motor command signals used when the abnormality does not occur in the one of the plurality of first inverter units.

14. The motor control device according to claim 13, wherein, when the abnormality occurs in the one of the plurality of first inverter units, the first motor command signal generator increases the first motor command signals to be output to the one of the plurality of second inverter units compared with the first motor command signals used when the abnormality does not occur in the one of the plurality of first inverter units.

15. The motor control device according to claim 14,
wherein the one of the plurality of first inverter units is a 1st first inverter unit of the plurality of first inverter units,
wherein, when an abnormality occurs in the 1st first inverter unit of the plurality of first inverter units, the first motor command signal generator increases the first motor command signals to be output to all inverter units of the multi-inverter unit other than the 1st first inverter unit compared with the first motor command signals used when the abnormality does not occur in the plurality of first inverter units.

16. The motor control device according to claim 15, wherein, when an abnormality occurs in the 1st first inverter unit of the plurality of first inverter units, the first motor command signal generator uniformly increases the first motor command signals to be output to all inverter units of the multi-inverter unit other than the 1st first inverter unit compared with the first motor command signals used when the abnormality does not occur in the plurality of first inverter units.

17. The motor control device according to claim 1,
wherein the first microcomputer includes a multi-inverter-unit abnormality detector, and
wherein the multi-inverter-unit abnormality detector is configured to execute current supply check control of detecting an abnormality of the multi-inverter unit through current supply to each of the one of the plurality of first inverter units and the one of the plurality of second inverter units.

18. The motor control device according to claim 17, wherein, among the one of the plurality of the first inverter units and the one of the plurality of second inverter units, when the first motor command signals are output to the one of the plurality of first inverter units, and the first motor command signals are not output to the one of the plurality of second inverter units, the multi-inverter-unit abnormality detector executes the current supply check control for the one of the plurality of second inverter units.

19. The motor control device according to claim 18, wherein, when a value of each of the first motor command signals is less than a predetermined value, the multi-inverter-unit abnormality detector executes the current supply check control.

20. The motor control device according to claim 19, wherein, when the value of each of the first motor command signals is equal to or larger than the predetermined value, the multi-inverter-unit abnormality detector avoids executing the current supply check control.

21. The motor control device according to claim 17, further comprising a relay,
wherein the relay is provided between the multi-inverter unit and the brushless motor unit, and
wherein, when the multi-inverter abnormality detector detects an abnormality of the one of the plurality of first inverter units, the relay disconnects a current supply circuit between the one of the plurality of first inverter units and the brushless motor unit.

22. The motor control device according to claim 17, wherein, when an abnormality occurs in the one of the plurality of first inverter units, the first motor command signal generator increases the first motor command signals to be output to the one of the plurality of second inverter units compared with the first motor command signals used when the abnormality does not occur in the one of the plurality of first inverter units.

23. The motor control device according to claim 1, further comprising a first current sensor and a second current sensor,
wherein the first motor command signal generator is configured to transmit the first motor command signals to the second stator coil,
wherein the first current sensor is configured to detect a value of a current flowing through the first stator coil,
wherein the second current sensor is configured to detect a value of a current flowing through the second stator coil, and
wherein the first motor command signal generator is configured to generate the first motor command signals based on an output signal of the first current sensor or an output signal of the second current sensor.

24. The motor control device according to claim 23,
wherein the first motor command signal generator is configured to generate the first motor command signals based on the output signal of the first current sensor, and wherein the second motor command signal generator is configured to generate the second motor command signals based on the output signal of the second current sensor.

25. A motor control device, the motor control device being configured to control driving of a brushless motor unit, the brushless motor unit including a motor rotor, a first stator coil and a second stator coil, the motor control device comprising a multi-inverter unit, wherein the multi-inverter unit includes a first inverter unit and a second inverter unit, wherein the first inverter unit is configured to output first motor drive signals to the first stator coil based on first motor command signals input to the first inverter unit, wherein the second inverter unit is configured to output the first motor drive signals to the first stator coil based on the first motor command signals input to the second inverter unit, wherein the motor control device further comprises a first inverter switching controller, wherein the first inverter switching controller is configured to selectively output the first motor command signals to the first inverter unit and the second inverter unit, wherein the motor control device further comprises a first microcomputer and a second microcomputer, wherein the first microcomputer includes a first inverter switching control signal generator and a first motor command signal generator, wherein the second microcomputer includes a second motor command signal generator, wherein the first inverter switching control signal generator is configured to generate a first inverter switching control signal to be output to the first inverter switching controller, wherein the first inverter switching control signal is a signal containing information about, in the first inverter switching controller, whether the first motor command signals are to be output to the first inverter unit and whether the first motor command signals are to be output to the second inverter unit, wherein the first motor command signal generator is configured to generate the first motor command signals serving as command signals, which are transmitted to the first stator coil to control the driving of the brushless motor unit, wherein the second motor command signal generator is configured to generate second motor command signals serving as command signals, which are transmitted to the second stator coil to control the driving of the brushless motor unit, wherein the first microcomputer includes a first watchdog timer signal output unit, wherein the first watchdog timer signal is output to the second microcomputer so that the second microcomputer determines whether an abnormality of the first microcomputer exists, wherein the second microcomputer includes a second watchdog timer signal output unit, and wherein the second watchdog timer signal is output to the first microcomputer so that the first microcomputer determines whether an abnormality of the second microcomputer exists.

* * * * *